(12) United States Patent
Kleppe et al.

(10) Patent No.: US 9,864,182 B2
(45) Date of Patent: *Jan. 9, 2018

(54) HIGH-RESOLUTION SCANNING MICROSCOPY

(71) Applicant: Carl Zeiss Microscopy GmbH, Jena (DE)

(72) Inventors: Ingo Kleppe, Jena (DE); Ralf Netz, Jena (DE); Thomas Kalkbrenner, Jena (DE); Ralf Wolleschensky, Jena (DE); Yauheni Novikau, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/489,885

(22) Filed: Sep. 18, 2014

(65) Prior Publication Data

US 2015/0077842 A1    Mar. 19, 2015

(30) Foreign Application Priority Data

Sep. 19, 2013 (DE) .................... 10 2013 015 933

(51) Int. Cl.
*G02B 21/00* (2006.01)
*G02B 21/06* (2006.01)
(Continued)

(52) U.S. Cl.
CPC ..... *G02B 21/0072* (2013.01); *G02B 21/0032* (2013.01); *G02B 21/0076* (2013.01);
(Continued)

(58) Field of Classification Search
CPC .. G02B 21/0072; G02B 21/025; G02B 21/06; G02B 21/16; G02B 27/58;
(Continued)

(56) References Cited

U.S. PATENT DOCUMENTS 4,346,295 A * 8/1982 Tanaka et al. ............... 250/586
5,093,563 A * 3/1992 Small et al. ............... 250/201.9
(Continued)

FOREIGN PATENT DOCUMENTS

CN         101 210 969 A       7/2008
DE    10 2006 021 317 B3      10/2007
(Continued)

OTHER PUBLICATIONS

Nicolas Caron, et al., "Polynomial phase masks for extending the depth of field of a microscope", Applied Optics, vol. 47, No. 22, Aug. 1, 2008, pp. E39-E43.*
(Continued)

*Primary Examiner* — Frank Font
(74) *Attorney, Agent, or Firm* — Duane Morris LLP

(57) ABSTRACT

A microscope and method for high resolution scanning microscopy of a sample, having: an illumination device for the purpose of illuminating the sample, an imaging device for the purpose of scanning at least one point or linear spot across the sample and of imaging the point or linear spot into a diffraction-limited, static single image below a reproduction scale in a detection plane. A detector device for detecting the single image in the detection plane for various scan positions is also provided. An evaluation device for the purpose of evaluating a diffraction structure of the single image for the scan positions is provided. The detector device has a detector array which has pixels and which is larger than the single image. At least one phase mask with a variable lateral profile of the phase influence is included in or near to the objective pupil, or in a plane which is conjugated to the objective pupil, for generating a spatial distribution of the illumination light and/or the detection light perpendicular to the optical axis, and/or in the direction of the optical axis.

45 Claims, 20 Drawing Sheets

(51) Int. Cl.
*G02B 21/16* (2006.01)
*G02B 21/02* (2006.01)
*G02B 27/58* (2006.01)
G02B 6/06 (2006.01)
G02B 26/08 (2006.01)
G02B 27/10 (2006.01)

(52) U.S. Cl.
CPC ........... *G02B 21/025* (2013.01); *G02B 21/06* (2013.01); *G02B 21/16* (2013.01); *G02B 27/58* (2013.01); *G02B 6/06* (2013.01); *G02B 21/008* (2013.01); *G02B 26/0833* (2013.01); *G02B 27/1013* (2013.01)

(58) Field of Classification Search
CPC .. G02B 21/0032; G02B 21/0076; G02B 6/06; G02B 21/008; G02B 26/0833; G02B 27/1013
USPC ..... 359/370, 380, 385; 250/208.1, 550, 221, 250/234–236; 348/80; 385/121
See application file for complete search history.

(56) References Cited

U.S. PATENT DOCUMENTS

| | | | |
|---|---|---|---|
| 5,428,475 | A | 6/1995 | Tanaami et al. |
| 5,777,342 | A | 7/1998 | Baer |
| 5,866,911 | A | 2/1999 | Baer |
| 5,952,668 | A | 9/1999 | Baer |
| 6,621,079 | B1* | 9/2003 | Shao ............... B82Y 20/00 250/234 |
| 7,242,468 | B1* | 7/2007 | Zhang ............... 356/301 |
| 7,576,862 | B2* | 8/2009 | Cromwell et al. ........... 356/445 |
| 8,275,226 | B2* | 9/2012 | Berman ............... 385/116 |
| 9,116,101 | B2* | 8/2015 | Chen ............... G01N 21/17 |
| 9,201,008 | B2* | 12/2015 | Theriault ............... G01N 21/64 |
| 9,256,202 | B2* | 2/2016 | Barbastathis ........ G03H 1/0005 |
| 9,470,883 | B2* | 10/2016 | Kalkbrenner ...... G02B 21/0032 |
| 2002/0141052 | A1 | 10/2002 | Iketaki |
| 2004/0036991 | A1* | 2/2004 | Kemp ............... 359/850 |
| 2005/0111089 | A1 | 5/2005 | Baer |
| 2005/0208431 | A1* | 9/2005 | Devoe et al. ............... 430/321 |
| 2006/0250688 | A1 | 11/2006 | Baer |
| 2008/0258077 | A1 | 10/2008 | Baer |
| 2009/0147269 | A1* | 6/2009 | Moore ............... 356/512 |
| 2009/0168158 | A1* | 7/2009 | Schwertner et al. ......... 359/385 |
| 2010/0093015 | A1 | 4/2010 | Panza et al. |
| 2011/0002530 | A1 | 1/2011 | Zhuang et al. |
| 2012/0319007 | A1* | 12/2012 | Kempe et al. ............ 250/459.1 |
| 2013/0181143 | A1* | 7/2013 | Betzig et al. ............ 250/459.1 |
| 2015/0008309 | A1* | 1/2015 | Wolleschensky .... G02B 21/002 250/208.1 |
| 2015/0077843 | A1* | 3/2015 | Huhse ............... G02B 21/0032 359/380 |
| 2015/0085099 | A1* | 3/2015 | Kleppe ............ G02B 21/0064 348/80 |
| 2015/0185454 | A1* | 7/2015 | Kalkbrenner ...... G02B 21/0032 250/550 |
| 2016/0131883 | A1* | 5/2016 | Kleppe ............. G02B 21/0072 348/79 |

FOREIGN PATENT DOCUMENTS

| | | |
|---|---|---|
| DE | 10 2006 026 204 A1 | 12/2007 |
| DE | 10 2008 049886 A1 | 4/2010 |
| DE | 10 2008 059 328 A1 | 6/2010 |
| EP | 1 157 297 B1 | 11/2002 |
| EP | 1 698 927 A1 | 9/2006 |
| EP | 2 249 194 A1 | 11/2010 |
| EP | 2 317 362 A1 | 5/2011 |
| EP | 2 520 965 A1 | 11/2012 |
| WO | WO 96/06369 | 2/1996 |
| WO | WO 2006/127692 A2 | 11/2006 |
| WO | WO 2006/127967 A2 | 11/2006 |
| WO | WO 2012/039636 A2 | 3/2012 |
| WO | WO 2013/135487 A1 | 9/2013 |

OTHER PUBLICATIONS

Muller, Claus B., et al., "Image Scanning Microscopy", Physical Review Letters 2010; 104(19):198101-1-198101-4.
Gong, Wei, et al., "Improved spatial resolution in fluorescence focal modulation microscopy", Optics Letters 2009; 34(22) 3508-3510.
Heintzmann, R., et al., "Laterally Modulated Excitation Microscopy: Improvement of resolution by using a diffraction grating"; In Proceedings of SPIE 1998; 3568:185-196.
Shao, Lin, et al.; "Super-resolution 3D microscopy of live whole cells using structured illumination"; Nature Methods 2011; 8(12):1044-1046.
Bertero, M., et al.; "Super-resolution in confocal scanning microscopy"; Inverse Problems 1987; 3:195-212.
Sheppard, C.J.R.; "Super-resolution in Confocal Imaging"; Optik 80 1988; 2:53-54.
Grochmalicki, J., et al.; "Superresolving masks for incoherent scanning microscopy"; J. Opt. Soc. Am. A 1993; 10(5):1074-1077.
York, Andrew G., et al.; "Resolution doubling in live, multicellular organisms via multifocal structured illumination microscopy"; Nature Methods 2012; 9(7):749-754.
Pavani, Sri Rama Prasanna, et al.; "High-efficiency rotating point spread functions"; Optics Express 2008; 16(5):3484-3489.
Hell, S. W. and Wichmann, J.; "Breaking the diffraction resolution limit by stimulated emission."; Optics Letters (1994); 19(11): 780-782.

* cited by examiner

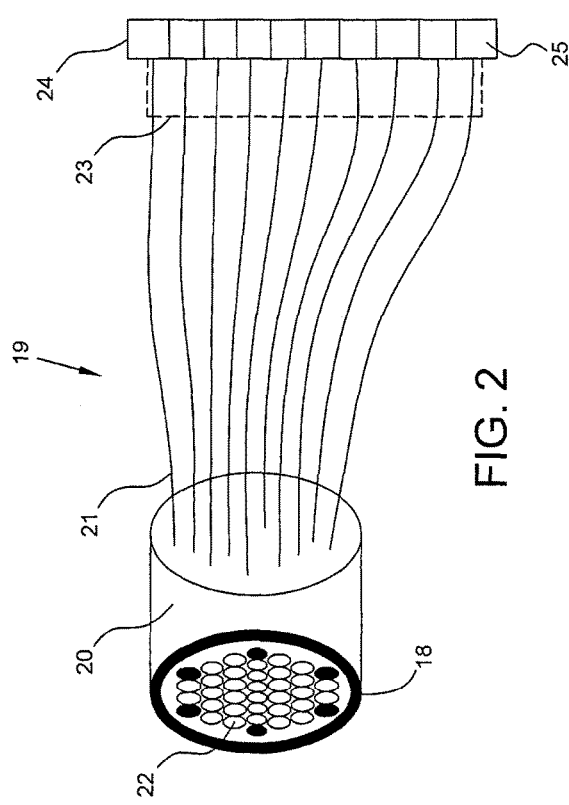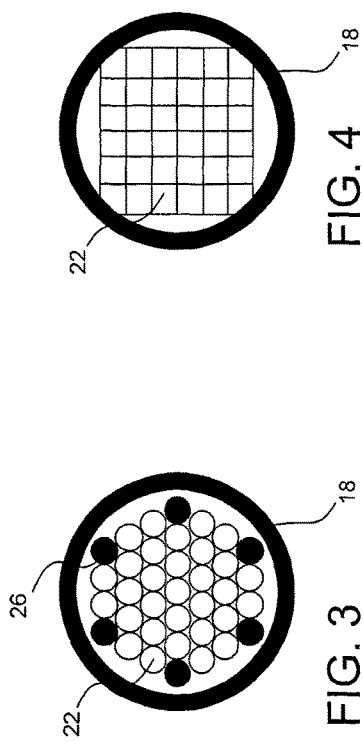

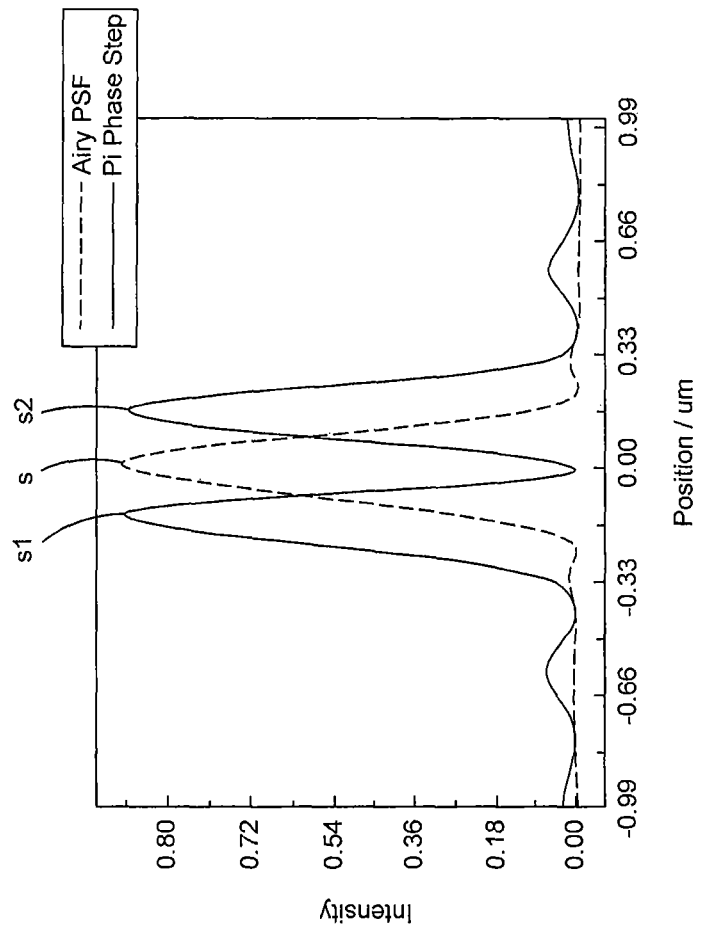
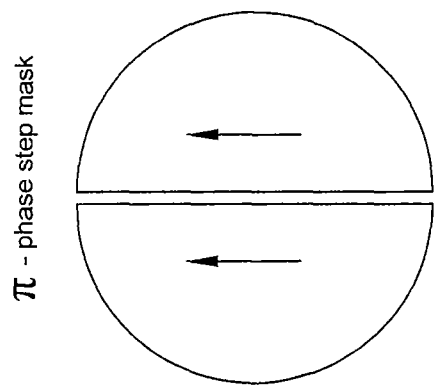
FIG. 9A

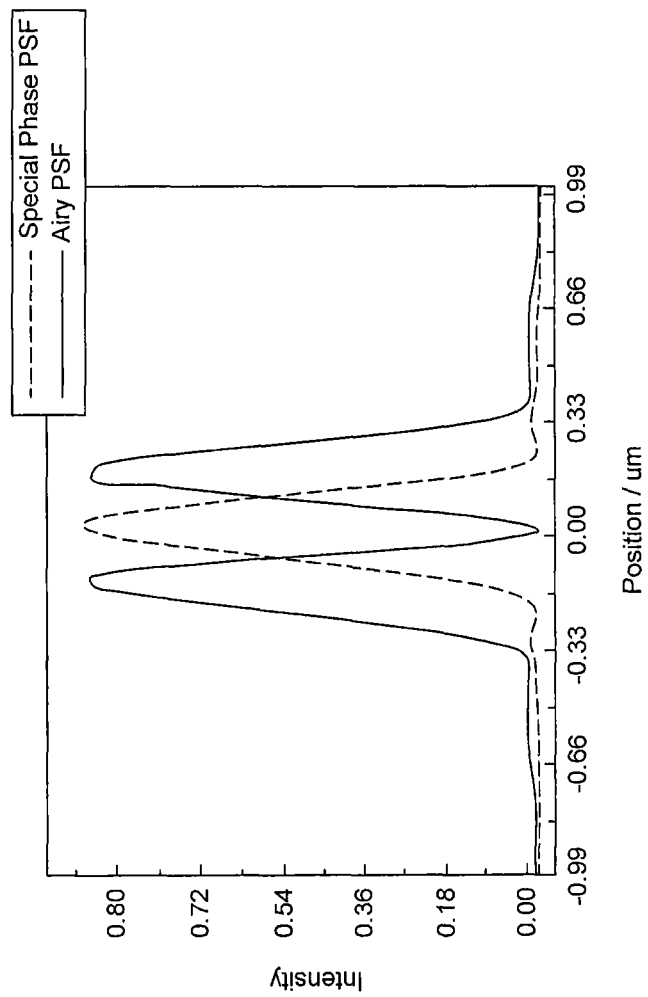
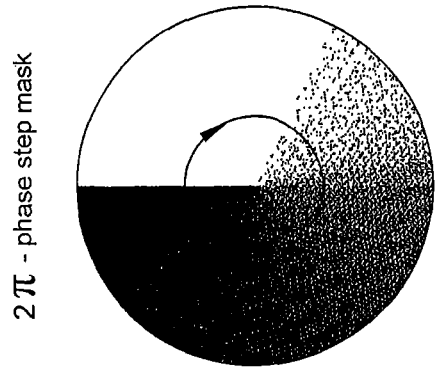
FIG. 9B

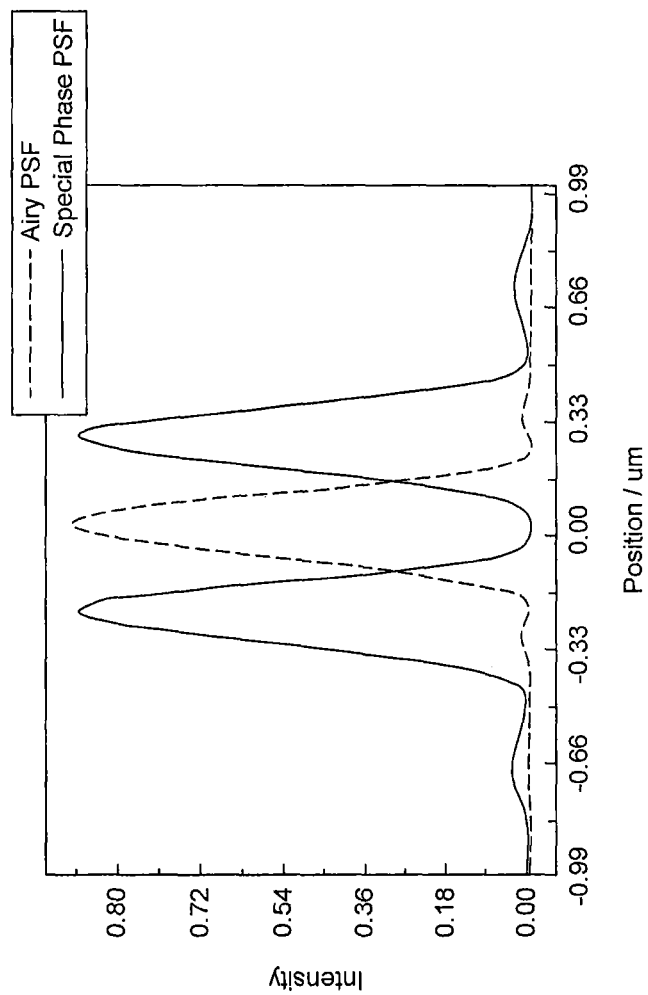
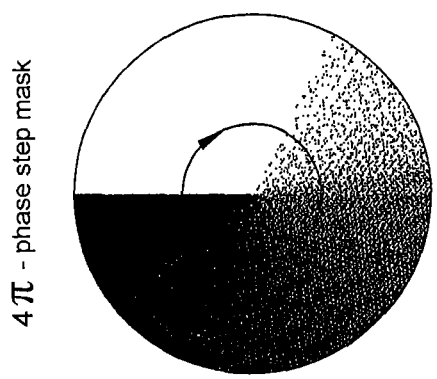
FIG. 9C

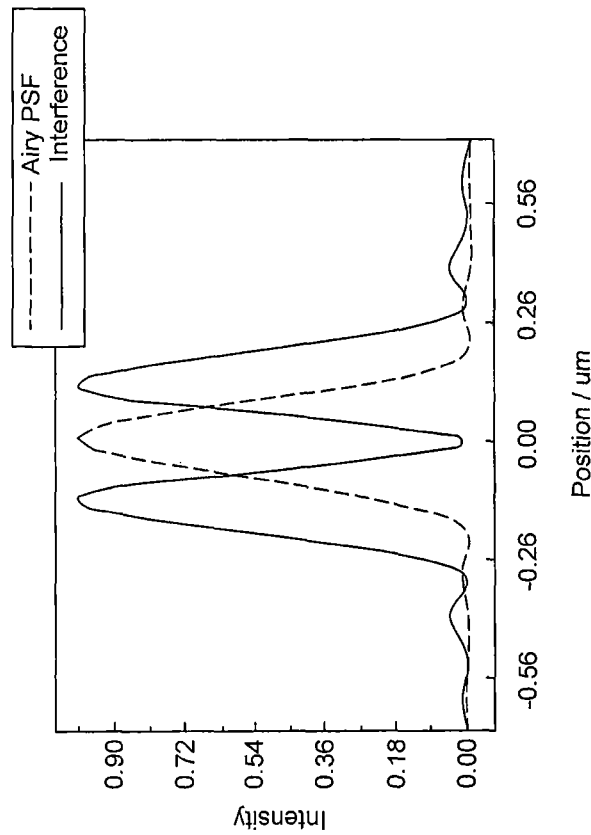
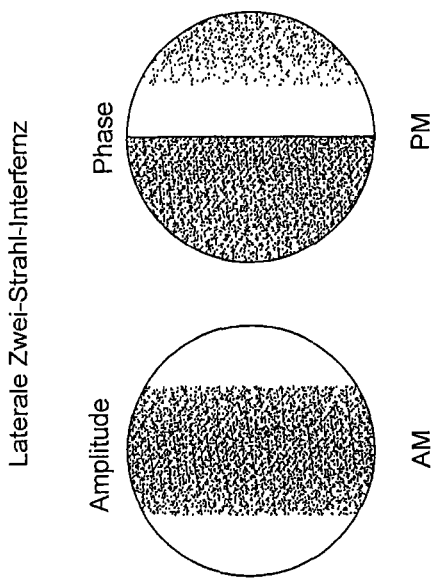
FIG. 9D

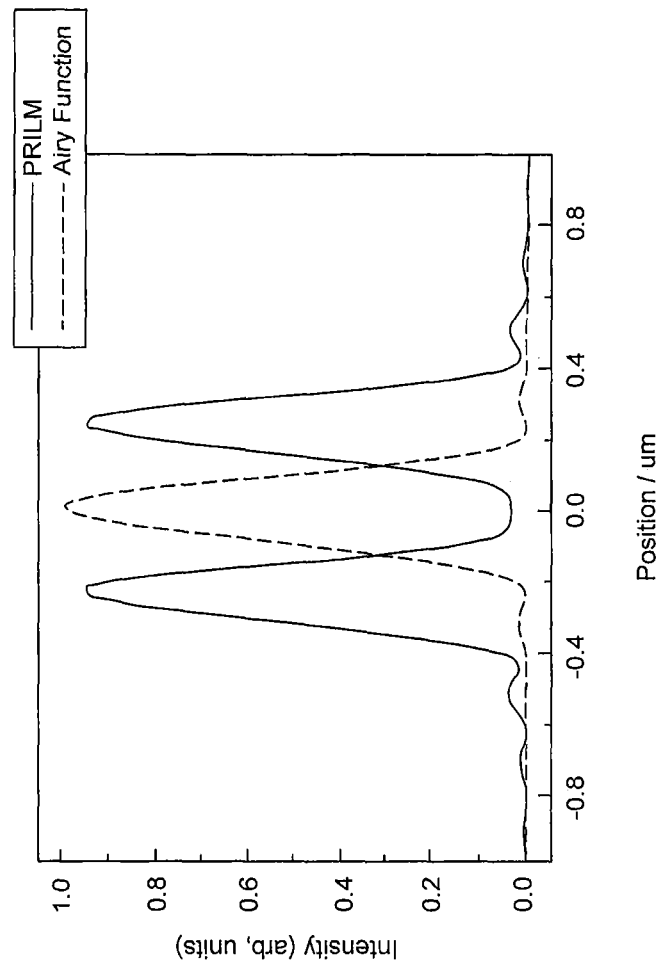
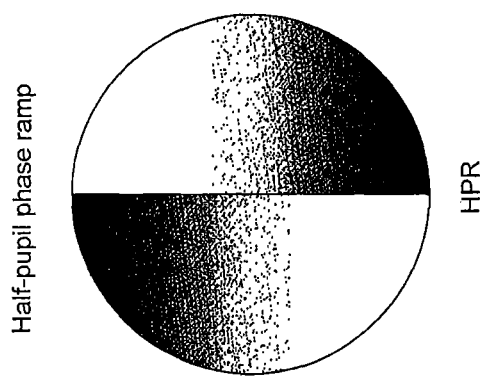
FIG. 10A

HIGH-RESOLUTION SCANNING MICROSCOPY

RELATED APPLICATIONS

The present application claims priority benefit of German Application No. DE 10 2013 015 933.4 filed on Sep. 19, 2013, the contents of which are incorporated by reference in its entirety.

FIELD OF THE INVENTION

The invention relates to a microscope for high resolution scanning microscopy of a sample, having an illumination device for the purpose of illuminating the sample, an imaging device for the purpose of scanning a point or linear spot across the sample and of imaging the point or linear spot into a diffraction-limited, static single image, with a reproduction scale in a detection plane, a detector device for the purpose of detecting the single image in the detection plane for various scan positions, with a location accuracy which, taking into account the reproduction scale, is at least twice as high as a full width at half maximum of the diffraction-limited single image, an evaluation device for the purpose of evaluating a diffraction structure of the single image for the scan positions, using data from the detector device, and for the purpose of generating an image of the sample which has a resolution which is enhanced beyond the diffraction limit. The invention further relates to a method for high resolution scanning microscopy of a sample, wherein the sample is illuminated, wherein a point or linear spot guided over the sample in a scanning manner is imaged into a single image, wherein the spot is imaged into the single image, with a reproduction scale, and diffraction-limited, and the single image is static in a detection plane, wherein the single image is detected for various different scan positions with a location accuracy which is at least twice as high, taking into account the reproduction scale, as a full width at half maximum of the diffraction-limited single image, such that a diffraction structure of the single image is detected, wherein for each scan position, the diffraction structure of the single image is evaluated and an image of the sample is generated which has a resolution which is enhanced beyond the diffraction limit.

BACKGROUND OF THE INVENTION

Prior literature of interest includes
[1] Heintzmann R.; Cremer C.: Laterally Modulated Excitation Microscopy: Improvement of resolution by using a diffraction grating; In *Proceedings of SPIE*, Vol. 3568 (1998)
[2] Shao L.; Kner P.; Hesper E; Gustafsson Mats G. L: Super-resolution 3D-microscopy of live whole cells using structured illumination; In *Nature Methods*, Vol. 8 (2011)
[3] Bertero et al., In *Inverse Problems* 3, 195 (1988)
[4] Sheppard et al., In *Optik* 80, No. 2, 53 (1982)
[5] Grochmalicki et al., In *J. Opt. Soc. Am. A* 10, 1074 (1993)
[6] C. B. Mueller et al., In *Phys. Rev. Lett.* 104, 198101 (2010)
[7] York A. G.; Parekh S. H.; Nogare D. D.; Fischer R. S.; Temprine K.; Mione M.; Chitnis A. B.; Combs C. A.; Shroff H.: Resolution doubling in live, multicellular organisms via multifocal structured illumination microscopy; In *Nature Methods*, Vol. 9 (2012)
[8] Pavani S. R. P. and Piestun R.: High-efficiency rotating point spread functions; In *Optics Express* 16 (2008), p. 3484
DE102006026204A1, DE 102008059328A1

Such a microscope and/or microscopy method is known from, by way of example, the publication C. Müller and J. Enderlein, Physical Review Letters, 104, 198101 (2010), or EP 2317362 A1, which also lists further aspects of the prior art.

This approach achieves an increase in location accuracy by imaging a diffraction-limited spot on a detection plane. The diffraction-limited imaging process images a point spot as an Airy disk. This diffraction spot is detected in the detection plane in such a manner that its structure can be resolved. Consequently, an oversampling is realized at the detector with respect to the imaging power of the microscope. The shape of the Airy disk is resolved in the imaging of a point spot. With a suitable evaluation of the diffraction structure—which is detailed in the documents named, the disclosure of which in this regard is hereby cited in its entirety in this application—an increase in resolution by a factor of 2 beyond the diffraction limit is achieved.

However, it is unavoidable in this case, for the detector, that it is necessary to capture a single image with multiple times more image information for each point on the sample which is scanned in this way, compared to a conventional laser scanning microscope (shortened to 'LSM' below). If the structure of the single image of the spot is detected, by way of example, with 16 pixels, not only is the volume of data per spot 16-times higher, but also a single pixel also contains, on average, only $1/16$ of the radiation intensity which would fall on the detector of an LSM in a conventional pinhole detection. Because the radiation intensity is of course not evenly distributed across the structure of the single image—for example the Airy disk—in reality even less, and particularly significantly less—radiation intensity arrives at the edge of this structure than the average value of $1/n$ for n pixels.

Consequently, the problem exists of being able to detect quantities of radiation at the detector at high resolution. Conventional charge coupled device (CCD) arrays which are typically used in microscopy do not achieve sufficient signal-to-noise ratios, such that even a prolongation of the duration for the image capture, which would already be disadvantageous in application per se, would not provide further assistance. Avalanche photodiode (APD) arrays also suffer from excessively high read noise, such that a prolongation of the measurement duration here as well would result in an insufficient signal/noise ratio. The same is true for complementary metal-oxide semiconductor (CMOS) detectors, which also are disadvantageous with regards to the size of the detector element, because the diffraction-limited single image of the spot would fall on too few pixels. Photomultiplier tube (PMT) arrays suffer from similar constructed space problems. The pixels in this case are likewise too large. The constructed space problems are particularly a result of the fact that an implementation of a microscope for high resolution can only be realized, as far as the effort required for development and the distribution of the device, are concerned, if it is possible to integrate the same into existing LSM constructions. However, specific sizes of the single images are pre-specified in this case. As a result, a detector with a larger surface area could only be installed if a lens were additionally configured which would enlarge the image once more to a significant degree—that is, several orders of magnitude. Such a lens is very complicated to design in cases where one wishes to obtain the diffraction-limited structure without further imaging errors.

Other methods are known in the prior art for high resolution, which avoid the problems listed above which occur during detection. By way of example, a method is mentioned in EP 1157297 B1, wherein non-linear processes are exploited using structured illumination. A structured illumination is positioned over the sample in multiple rotary and point positions, and the sample is imaged on a wide-field detector in these different states in which the limitations listed above do not exist.

A method which also achieves high resolution without the detector limitations listed above (that is, a resolution of a sample image beyond the diffraction limit) is known from WO 2006127692 and DE 102006021317. This method, abbreviated as PALM, uses a marking substance which can be activated by means of an optical excitation signal. Only in the activated state can the marking substance be stimulated to release certain fluorescence radiation by means of excitation light. Molecules which are not activated do not emit fluorescent radiation, even after illumination with excitation light. The excitation light therefore switches the marking substance into a state in which it can be stimulated to fluoresce. Therefore, this is generally termed a 'switching signal'. The same is then applied in such a manner that at least a certain fraction of the activated marking molecules are spaced apart from neighboring, likewise-activated marking molecules in such a manner that the activated marking molecules are separated on the scale of the optical resolution of the microscope, or can be separated retroactively. This is termed 'isolation' of the activated molecules. It is easy, for these isolated molecules, to determine the center of their radiation distribution which is limited by the resolution, and to therefore determine the location of the molecules using calculation, with a higher precision than the optical imaging actually allows. To image the entire sample, the PALM method takes advantage of the fact that the probability of a marking molecule being activated by the switching signal at a given intensity of the switching signal is the same for all of the marking molecules. The intensity of the switching signal is therefore applied in such a manner that the desired isolation results. This method step is repeated until the greatest possible number of marking molecules have been excited [at least] one time within a fraction which has been excited to fluorescence.

SUMMARY OF THE INVENTION

In the invention, the spot sampled on the sample is imaged statically in a detection plane. The radiation from the detection plane is then redistributed in a non-imaging manner and directed to the detector array. The term "non-imaging" in this case refers to the single image present in the detection plane. Individual regions of the area of this single image can of course, however, be imaged within the laws of optics. As such, imaging lenses can naturally be placed between the detector array and the redistribution element. The single image in the detection plane, however, is not preserved as such in the redistribution.

The term "diffraction-limited" should not be restricted here to the diffraction limit according to Abbe's Theory. Rather, it should also encompass situations in which the configuration fails to reach theoretical maximum by an error of 20%, due to actual insufficiencies or limitations. In this case as well, the single image has a structure which is termed a "diffraction structure" in this context. It is oversampled.

This principle makes it possible to use a detector array, the size of which does not match the single image. The detector array is advantageously larger or smaller in one dimension than the single image being detected. The idea of the different geometric configuration includes both a different elongation of the detector array and an arrangement with a different aspect ratio with respect to the height and width of the elongation of the single image in the detection plane. The pixels of the detector array can additionally be too large for the required resolution. It is also allowable, at this point, for the outline of the pixel arrangement of the detector array to be fundamentally different than the outline which the single image has in the detection plane. In any case, the detector array according to the invention has a different size than the single image in the detection plane. The redistribution in the method and/or the redistribution element in the microscope make it possible to select a detector array without needing to take into account the dimensional limitations and pixel size limitations which arise as a result of the single image and its size. In particular, it is possible to use a detector row as a detector array.

The image of the sample is created from a plurality of single images, in the conventional LSM manner by scanning the sample with the spot, wherein each of the single images is associated with another sampling position—that is, another scan position.

The concept of the invention can also be carried out at the same time for multiple spots in a parallelized manner, as is known for laser scanning microscopy. In this case, multiple spots are sampled on the sample in a scanning manner, and the single images of the multiple spots lie next to each other statically in the detection plane. They are then either redistributed by a shared redistribution element which is accordingly large with respect to surface area, and/or by multiple individual redistribution elements, then relayed to an accordingly large single detector array and/or to multiple individual detector arrays.

The subsequent description focuses, by way of example, on the sampling process using an individual spot. However, this should not be understood as a limitation, and the described features and principles apply in the same manner for the parallel sampling of multiple point spots, as well as to the use of a linear spot. The latter case is of course only diffraction-limited in the direction perpendicular to the elongation of the line, such that the features of this description with regards to this aspect only apply in one direction (perpendicular to the elongation of the line).

With the procedure according to the invention, the LSM method can be carried out at a satisfactory speed and with acceptable complexity of the apparatus.

The invention opens up a wide field of applications for a high resolution microscopy principle which has not existed to date.

One possibility for realizing the redistribution and/or the redistribution element consists of using a bundle of optical fibers. These can preferably be designed as multi-mode optical fibers. The bundle has an input which is arranged in the detection plane and which has an adequate dimensioning for the dimensions of the diffraction-limited single image in the detection plane. In contrast, at the output, the optical fibers are arranged in the geometric arrangement which is prespecified by the detector array, and which differs from the input. The output ends of the optical fibers in this case can be guided directly to the pixels of the detector array. It is particularly advantageous if the output of the bundle is gathered in a plug which can be easily plugged into a detector row—for example an APD or PMT row.

It is important for the understanding of the invention to differentiate between pixels of the detector array and the image pixels with which the single image is resolved in the detection plane. Each image pixel is generally precisely functionally assigned to one pixel of the detector array. However, the two are different with respect to their arrangement. Among other things, it is a characterizing feature of the invention that, in the detection plane, the radiation is captured on image pixels which produce an oversampling of the single image with respect to their size and arrangement. In this manner, the structure of the single image is resolved which, due to the diffraction-limited production of the single image, is a diffraction structure. The redistribution element has an input side on which this image pixel is provided. The input side lies in the detection plane. The redistribution element directs the radiation on each image pixel to one of the pixels of the detector array. The assignment of image pixels to pixels of the detector array does not preserve the image structure, which is why the redistribution is non-imaging with respect to the single image. The invention could therefore also be characterized in that, in a microscope of the class, the detector device has a non-imaging redistribution element which has input sides in the detection plane, at which the radiation is captured by means of image pixels. The redistribution element further has an output side on which the radiation captured at the image pixels is relayed to pixels of a detector array, wherein the radiation is redistributed from the input side to the output side in a non-imaging manner with respect to the single image. In an analogous manner, the method according to the invention could be characterized in that, in a method of the class, the radiation is captured in the detection plane by means of image pixels which are redistributed to pixels of the detector array in a non-imaging manner with respect to the single image. The detector array differs from the arrangement and/or the size of the image pixels in the detection plane as regards the arrangement and/or size of its pixels. In addition, the image pixels in the detection plane are provided by the redistribution element in such a manner that, with respect to the diffraction limit, the diffraction structure of the single image is oversampled.

In highly-sensitive detector arrays, it is known that adjacent pixels demonstrate interference when radiation intensities are high, as a result of crosstalk. To prevent this, an implementation is preferred in which the optical fibers are guided from the input to the output in such a manner that optical fibers which are adjacent at the output are also adjacent at the input. Because the diffraction-limited single image does not demonstrate any large jumps in radiation intensity changes, such a configuration of the redistribution element automatically ensures that adjacent pixels of the detector array receive the least possible differences in radiation intensity, which minimizes crosstalk.

In place of a redistribution based on optical fibers, it is also possible to equip the redistribution element with a mirror which has mirror elements with different inclinations. Such a mirror can be designed, by way of example, as a multi-faceted mirror, a digital micromirror device (DMD), or adaptive mirror, wherein in the latter two variants, a corresponding adjustment and/or control process ensures the inclination of the mirror elements. The mirror elements direct the radiation from the detection plane to the pixels of the detector array, the geometrical design of which is different from the mirror elements.

The mirror elements depict—as do the optical fiber ends at the input of the optical fiber bundle—the image pixels with respect to the resolution of the diffraction structure of the single image. Their size is decisive for the oversampling. The pixel size of the detector array is not. As a result, a group of multiple single detectors is understood in this case to be a detector array, because they always have a different arrangement (that is—a larger arrangement) than the image pixels in the detection plane.

In LSM, different lenses are used depending on the desired resolution. An exchange of a lens changes the dimensions of a single image in the detection plane. For this reason, it is preferred that a zoom lens is arranged in front of the detection plane in the direction of imaging for the purpose of matching the size of the single image to the size of the detector device. Such a zoom lens varies the size of the single image in a percent range which is significantly smaller than 100%, and is therefore much simpler to implement than a multiplication of the size of the single image—which was described as disadvantageous above.

The illumination of the sample is preferably carried out as in a typical LSM process, likewise scanning—although this is not absolutely necessary. However, the maximum increase in resolution is achieved in this way. If the sample is illuminated in a scanning manner, it is advantageous that the illumination device and the imaging device have a shared or common scanning device which guides an illumination spot across the sample, and simultaneously descans the spot at which the sample is imaged, which is coincident with the illumination spot, with respect to the detector, such that the single image is static in the detection plane. In such a construction, the zoom lens can be placed in the shared part of the illumination device and imaging device. The lens then makes it possible to not only match the single image to the size of the detector in the detection plane, but also it additionally enables the available illumination radiation to be coupled into the objective pupil completely, without edge loss, wherein said objective pupil can vary together with the selection of the lens.

A radiation intensity-dependent crosstalk between adjacent pixels of the detector array can, as already explained, be reduced during the redistribution by means of an optical fiber bundle by a suitable arrangement of the optical fibers in the bundle.

In addition or alternatively thereto, it is also possible to carry out a calibration. For this purpose, each optical fiber receives radiation one after the other, and the interference signal is detected in neighboring pixels. In this manner, a calibration matrix is established, by means of which a radiation intensity-dependent crosstalk between adjacent pixels is corrected in the later microscopy of the sample.

The resolution of the diffraction structure of the single image also makes it possible to determine a direction of movement of the spot, wherein the sample is moved along the same during the scanning. This direction of movement is known in principle from the mechanism of the scanner (for example, a scanning mirror or a moving sample table), but nevertheless there are residual inaccuracies in this case arising from the mechanism. These can be eliminated by evaluating signals of individual pixels of the detector array by means of cross-correlation. In this case, one takes advantage of the fact that, adjacent image pixels in the sample overlap to a certain degree due to the diffraction-limited imaging of the spot, whereas their centers lie adjacent to each other. If the signals of such image pixels are subjected to a cross-correlation, it is possible to reduce and/or to completely eliminate a residual inaccuracy which persists as a result of unavoidable tolerances of the scanning mechanism.

In addition to the increased resolution, it is possible to detect a chronological change in the fluorescence in the detection volume comprised by the spot via the spatial and chronological correlation of the signals from a series of measurements of the individual detector elements (to which the image pixels in the detection plane are functionally assigned). By way of example, diffusion coefficients can be determined from a chronological correlation, as in fluorescence correlation spectroscopy, and oriented diffusion and diffusion barriers can be visualized by incorporating the spatial correlation between image pixels. Movement processes of the fluorescence molecules are also of great interest for tracking applications as well, because the illumination spot in this case should follow the movement of the fluorescent molecules. The arrangement described here makes it possible to determine the movement direction with high precision, even during the bleaching time of a pixel. For this reason, it is preferred, as one implementation, that changes in the sample are detected by means of determining and evaluating a chronological change in the diffraction-limited single image for the point or linear spot which is stationary in the sample.

The procedure according to the invention also makes it possible to modify the illumination distribution in scanning illumination processes—for example by means of a phase filter. The method as described in Gong et al., Opt. Let., 34, 3508 (2009) can be realized very easily as a result.

Where a method is described herein, a control device implements this method in the operation of the microscope.

It should be understood that the features named above and explained further below can be used not only in the given combinations, but also in other combinations or alone without departing from the scope of the present invention.

BRIEF DESCRIPTION OF THE DRAWINGS

The invention is described in greater detail below with reference to the attached drawings, which also disclose essential features of the invention, wherein:

FIG. 2 shows an enlarged illustration of a detector device of the microscope in FIG. 1;

FIG. 3 and FIG. 4 show top views of possible embodiments of the detector device 19 in a detection plane;

FIGS. 9(a)-(d) show examples for phase/amplitude functions in the pupil, and associated cross-sections through the 2D intensity distribution of the illumination;

FIG. 9(a) shows such an example for phase/amplitude functions in the pupil with a π-Phase-Step-Mask;

FIG. 9(b) shows another such example with a 2 π-Phase-Step-Mask;

FIG. 9(c) shows yet another such example with a 4 π-Phase-Step-Mask;

FIG. 9(d) shows a further such example with lateral two beam interference;

FIG. 10(a) shows an example of a half-pupil phase ramp in the pupil with an opposing alignment of the ramp, and the associated cross-section through the 2D intensity distribution of the illumination;

FIG. 11(a) shows a non-compensated phase function in a single and/or double passage.

FIGS. 11(b) and (c) show a compensated phase function for light propagated through the phase masks in both directions.

DESCRIPTION OF THE EMBODIMENTS

Figure 1:
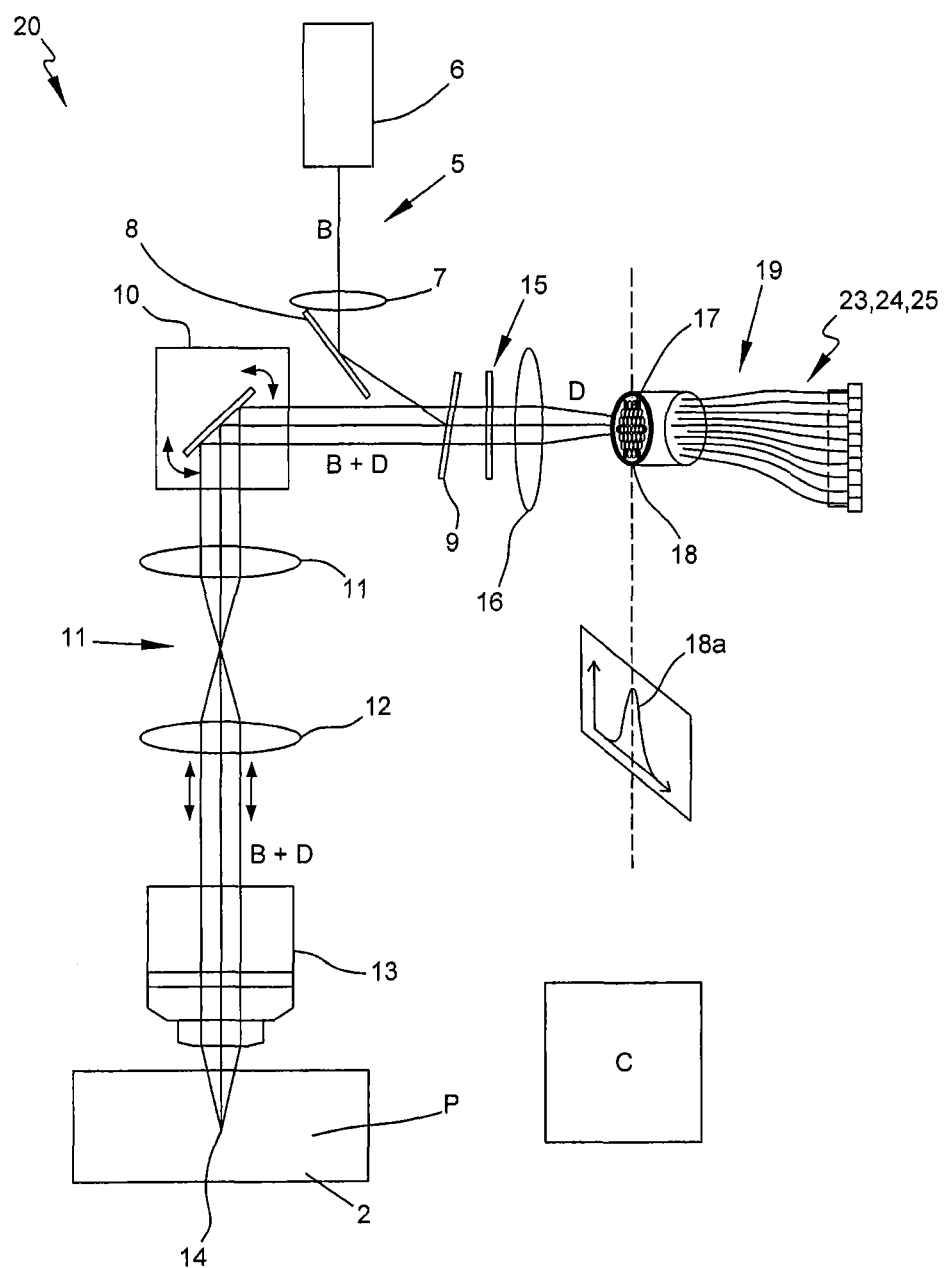
FIG. 1 shows a schematic illustration of a laser scanning microscope for high resolution microscopy.

FIG. 1 schematically shows a laser scanning microscope 1 which is designed for the purpose of microscopy of a sample 2. The laser scanning microscope (abbreviated below as LSM) 1 is controlled by a control device C and comprises an illumination beam path 3 and an imaging beam path 4. The illumination beam path illuminates a spot in the sample 2, and the imaging beam path 4 images this spot, subject to the diffraction limit, for the purpose of detection. The illumination beam path 3 and the imaging beam path 4 share a plurality of elements. However, this is likewise less necessary than a scanned spot illumination of the sample 2. The same could also be illuminated in wide-field.

The illumination of the sample 2 in the LSM 1 is carried out by means of a laser beam 5 which is coupled into a mirror 8 via a deflection mirror 6, which is not specifically functionally necessary, and a lens 7. The mirror 8 functions so that the laser beam 5 falls on an emission filter 9 at a reflection angle. To simplify the illustration, only the primary axis of the laser beam 5 is drawn for the same.

Following the reflection on the emission filter 9, the laser beam 5 is deflected biaxially by a scanner 10, and focused by means of lenses 11 and 12 through an objective 13 to a spot 14 in the sample 2. The spot in this case is point-shaped in the illustration in FIG. 1, but a linear spot is also possible. Fluorescence radiation excited in the spot 14 is routed via the objective 13, the lenses 11 and 12, and back to the scanner 10, after which a static light beam once more is present in the imaging direction. This passes through the emission filters 9 and 15, which have the function of selecting the fluorescence radiation in the spot 14, with respect to the wavelength thereof, and particularly of separating the same from the illumination radiation of the laser beam 5, which can serve as excitation radiation, by way of example. A lens 16 functions so that the spot 14 overall is imaged into a diffraction-limited image 17 which lies in a detection plane 18. The detection plane 18 is a plane which is conjugated to the plane in which the spot 14 in the sample 2 lies. The image 17 of the spot 14 is captured in the detection plane 18 by a detector device 19 which is explained in greater detail below in the context of FIGS. 2 to 4. In this case, it is essential that the detector device 19 spatially resolves the diffraction-limited image 17 of the spot 14 in the detection plane 18.

The intensity distribution of the spot over the detection cross-section (the Gaussian distribution) in 18 is illustrated below as 18a in FIG. 1.

The control device C controls all components of the LSM 1, particularly the scanner 10 and the detector device 19. The control device captures the data of each individual image 17 for different scan positions, analyzes the diffraction structure thereof, and generates a high resolution composite image of the sample 2.

The LSM 1 in FIG. 1 is illustrated by way of example for a single spot which is scanned on the sample. However, it can also be used for the purpose of scanning according to a linear spot which extends, by way of example, perpendicular to the plane of the drawing in FIG. 1. It is also possible to design the LSM 1 in FIG. 1 in such a manner that multiple adjacent point spots in the sample are scanned. As a result, their corresponding single images 17 lie in the detection plane 18, likewise adjacent to each other. The detector device 19 is then accordingly designed to detect the adjacent single images 17 in the detection plane 18.

The detector device 19 is illustrated in an enlarged fashion in FIG. 2. It consists of an optical fiber bundle 20 which feeds a detector array 24. The optical fiber bundle 20 is built up of individual optical fibers 21. The ends of the optical fibers 21 form the optical fiber bundle input 22, which lies in the detection plane 18. The individual ends of the optical fibers 21 therefore constitute pixels by means of which the diffraction-limited image 17 of the spot 14 is captured. Because the spot 14 in the embodiment in FIG. 1 is, by way of example, a point spot, the image 17 is an Airy disk, the size of which remains inside the circle which, in FIGS. 1 and 2, represents the detection plane 18. The size of the optical fiber bundle input 22 is therefore such that the size of the Airy disk is covered thereby. The individual optical fibers 21 in the optical fiber bundle 20 are given a different geometric arrangement at their outputs than at the optical fiber bundle input 22, particularly in the form of an extended plug 23 in which the output ends of the optical fibers 21 lie adjacent to each other.

The plug 23 is designed to match the geometric arrangement of the detector row 24—that is, each output end of an optical fiber 21 lies precisely in front of a pixel 25 of the detector row 24.

The geometric dimensions of the redistribution element are entirely fundamental —meaning that they are matched on the input side thereof to the dimensions of the single image (and/or, in the case of multiple point-spots, to the adjacent single images), regardless of the implementation of the redistribution element, which is made in FIG. 4 by an optical fiber bundle). The redistribution element has the function of capturing the radiation from the detection plane 18, in such a manner that the intensity distribution of the single image 17, measured by the sampling theorem, is oversampled with respect to the diffraction limit. The redistribution element therefore has pixels (formed by the input ends of the optical fibers in the construction shown in FIG. 3) lying in the detection plane 18, which are smaller by at least a factor of 2 than the smallest resolvable structure which is produced in the detection plane 18 from the diffraction limit, taking into account the reproduction scale.

Of course, the use of a plug 23 is only one of many possibilities for arranging the output ends of the optical fibers 21 in front of the pixels 25. It is equally possible to use other connections. In addition, the individual pixels 25 can be directly fused to the optical fibers 21. It is not at all necessary to use a detector row 24. Rather, an individual detector can be used for each pixel 25.

FIGS. 3 and 4 show possible embodiments of the optical fiber bundle input 22. The optical fibers 21 can be melted together at the optical fiber bundle input 22. In this way, a higher fullness factor is achieved—meaning that holes between the individual optical fibers 21 at the optical fiber bundle input 22 are minimized. The melting would also lead to a certain crosstalk between adjacent optical fibers. If one would like to prevent this, the optical fibers can be glued. A rectangular arrangement of the ends of the optical fibers 21 is also possible, as FIG. 4 shows.

The individual optical fibers 21 are preferably functionally assigned to the individual pixels 25 of the detector array 24 in such a manner that optical fibers 21 positioned adjacent to each other at the optical fiber bundle input 22 are also adjacent at the detector array 24. By means of this approach, crosstalk in minimized between adjacent pixels 25, wherein said crosstalk can arise, by way of example, from scatter radiation or during the signal processing of the individual pixels 25. If the detector array 24 is a row, the corresponding arrangement can be achieved by fixing the sequence of the individual optical fibers on the detector row using a spiral which connects the individual optical fibers one after the other in the perspective of a top view of the detection plane 18.

FIG. 3 further shows blind fibers 26 which lie in the corners of the arrangement of the optical fibers 21 at the optical fiber bundle input 22. These blind fibers are not routed to pixels 25 of the detector array. At the positions of the blind fibers, there would no longer be any signal intensity required for the evaluation of the signals. As a result, one can reduce the number of the optical fibers 21, and therefore the number of the pixels 25 in the detector row 24 or the detector array, in such a manner that it can be possible to work with 32 pixels, by way of example. Such detector rows 24 are already used in other ways in laser scanning microscopy, with the advantage that only one signal evaluation electronic unit needs to be installed in such laser scanning microscopes, and a switch is then made between an existing detector row 24 and the further detector row 24 which is added by the detector device 19.

According to FIG. 4, optical fibers with a square base shape are used for the bundle. They likewise have a high degree of coverage in the detection plane, and therefore efficiently collect the radiation.

Figure 5:
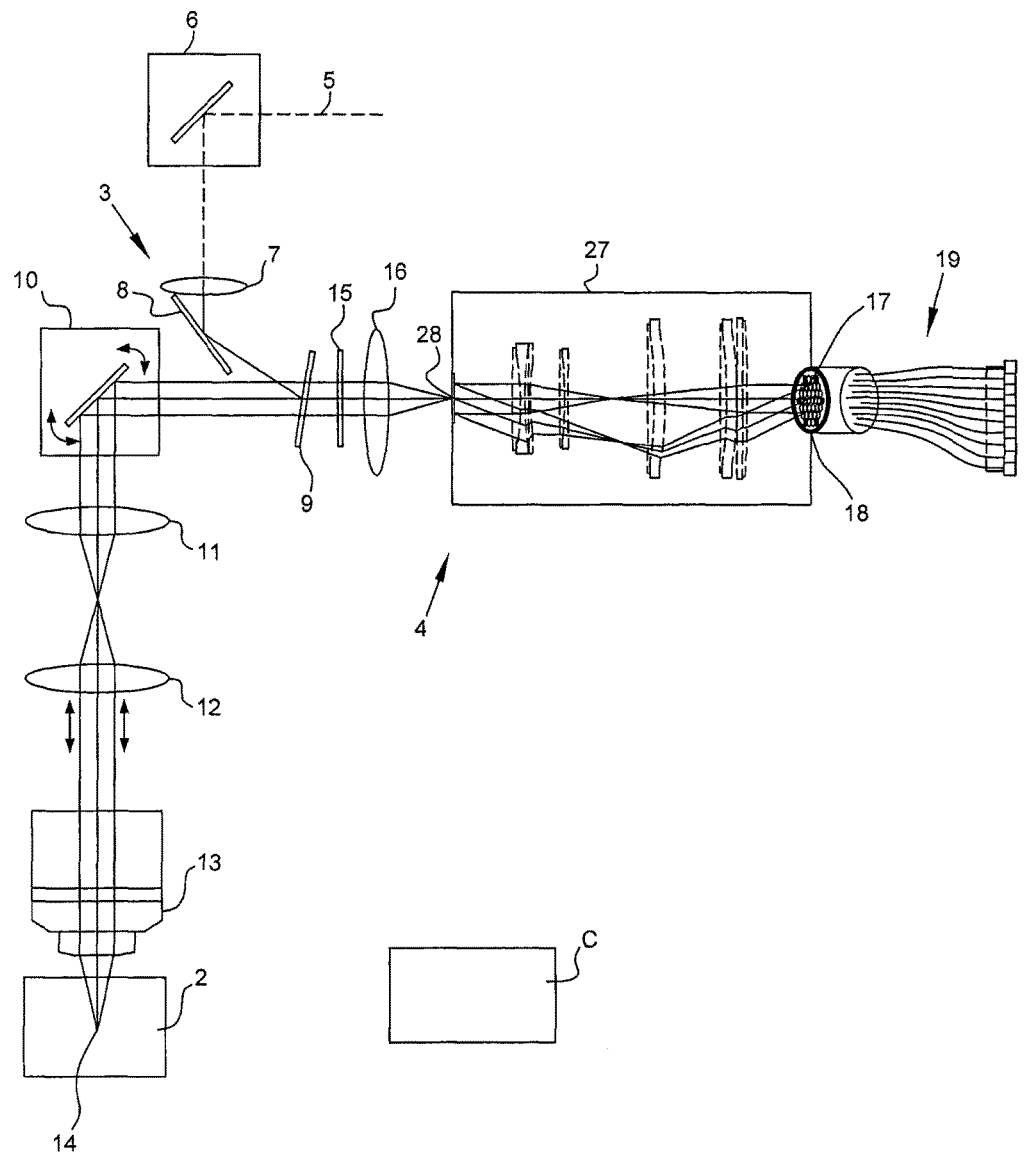
FIG. 5 shows one implementation of the microscope in FIG. 1 using a zoom lens, for the purpose of adapting the size of the detector field.

FIG. 5 shows one implementation of the LSM 1 in FIG. 1, wherein a zoom lens 27 is arranged in front of the detection plane 18. The conjugated plane in which the detection plane 18 was arranged in the construction shown in FIG. 1 now forms an intermediate plane 28, from which the zoom lens 27 captures the radiation and relays the same to the detection plane 18. The zoom lens 27 makes it possible for the image 17 to be optimally matched to the dimensions of the input of the detector device 19.

Figure 6:
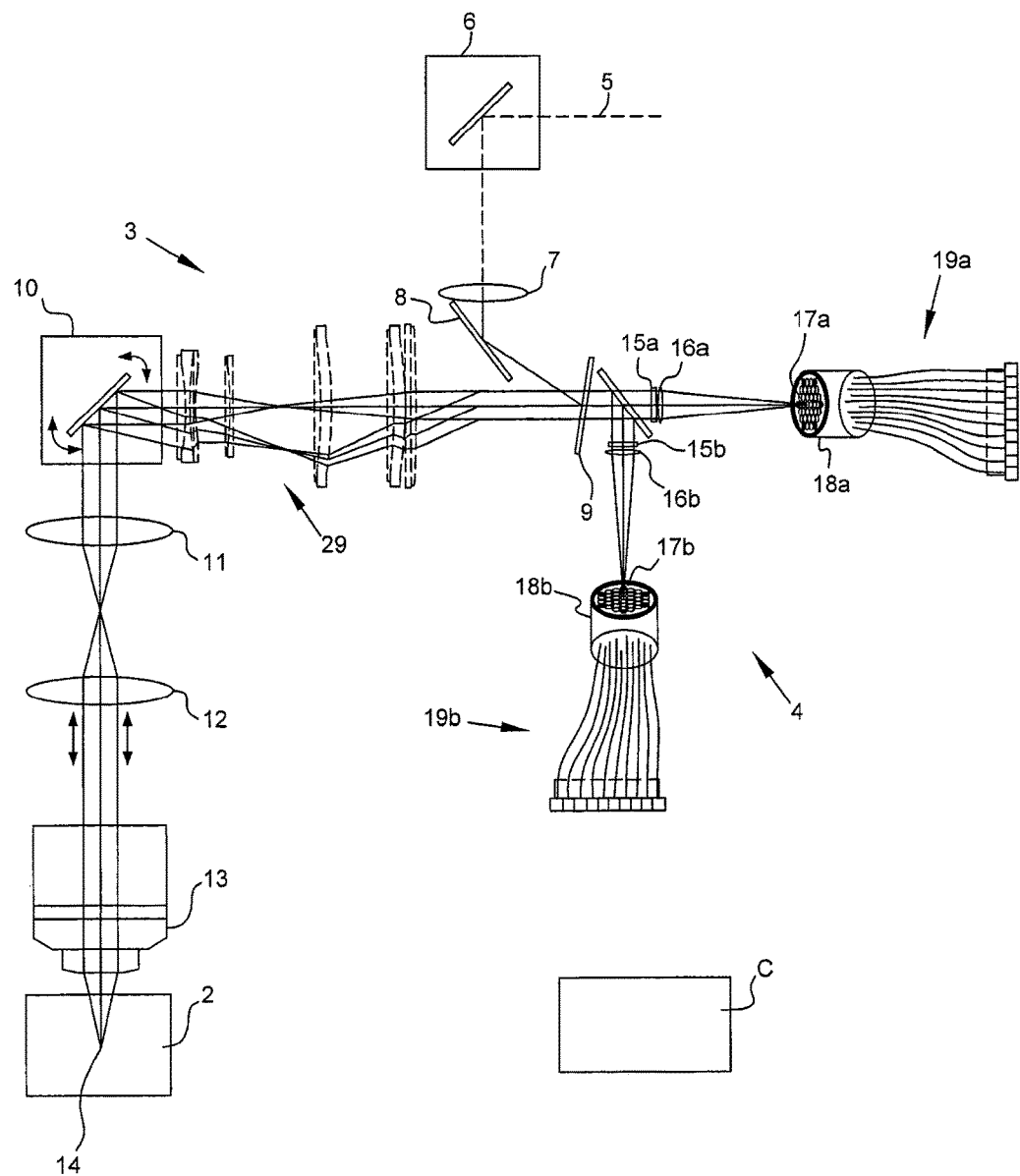
FIG. 6 shows a modification of the microscope in FIG. 5 with respect to the zoom lens and with respect to a further implementation for multi-color imaging.

FIG. 6 shows yet another modification of the laser scanning microscope 1 in FIG. 1. On the one hand, the zoom lens is arranged in this case as the zoom lens 29, in such a manner that it lies in a part of the beam path, the same being the route of both the illumination beam path 3 and the imaging beam path 4. As a result, the advantage is accrued that not only the size of the image 17 on the input side of the detector device 19 can be adapted, but also that the pupil fullness of the lens 13, relative to the imaging beam path 4, and therefore the exploitation of the laser beam 5, can be adapted as well.

In addition, the LSM 1 in FIG. 6 also has a two-channel design, as a result of the fact that a beam splitter is arranged downstream of the emission filter 9, and separates the radiation into two separate color channels. The corresponding elements of the color channels each correspond to the elements which are arranged downstream of the emission filter 9 in the imaging direction in the LSM 1 in FIG. 1. The color channels are differentiated in the illustration in FIG. 6 by the reference number suffixes "a" and/or "b".

Of course, the implementation using two color channels is independent of the use of the zoom lens 29. However, the combination has the advantage that a zoom lens 27 which would need to be independently included in each of the color channels, and therefore would be present twice, is only necessary once. Of course, the zoom lens 27 can also, however, be used in the construction according to FIG. 1, and the LSM 1 in FIG. 6 can also be realized without the zoom lens 29.

Figure 7:
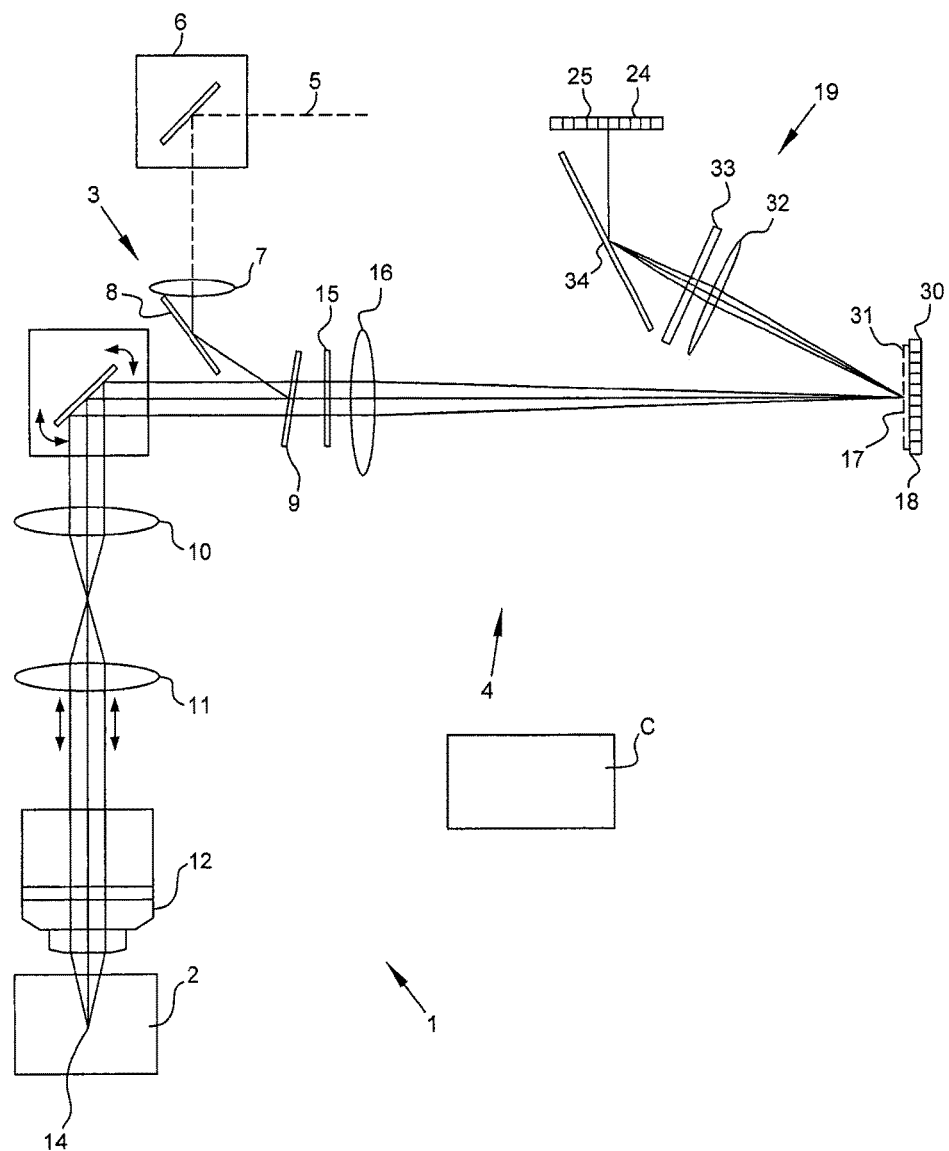
FIG. 7 shows a modification of the microscope in FIG. 1, wherein the modification pertains to the detector device.

FIG. 7 shows a modification of the LSM 1 in FIG. 1, with respect to the detector device 19.

The detector device 19 now has a multi-facet mirror 30 which carries individual facets 31. The facets 31 correspond to the ends of the optical fibers 21 at the optical fiber bundle input 22 with respect to the resolution of the image 17. The individual facets 31 differ with respect to their inclination from the optical axis of the incident beam. Together with a lens 32 and a mini-lens array 33, as well as a deflector mirror 34 which only serves the purpose of beam folding, each facet 31 reproduces a surface area segment of the single image 17 on one pixel 25 of a detector array 24. Depending on the orientation of the facets 31, the detector array 24 in this case can preferably be a 2D array. However, a detector row is also possible.

Figure 8:
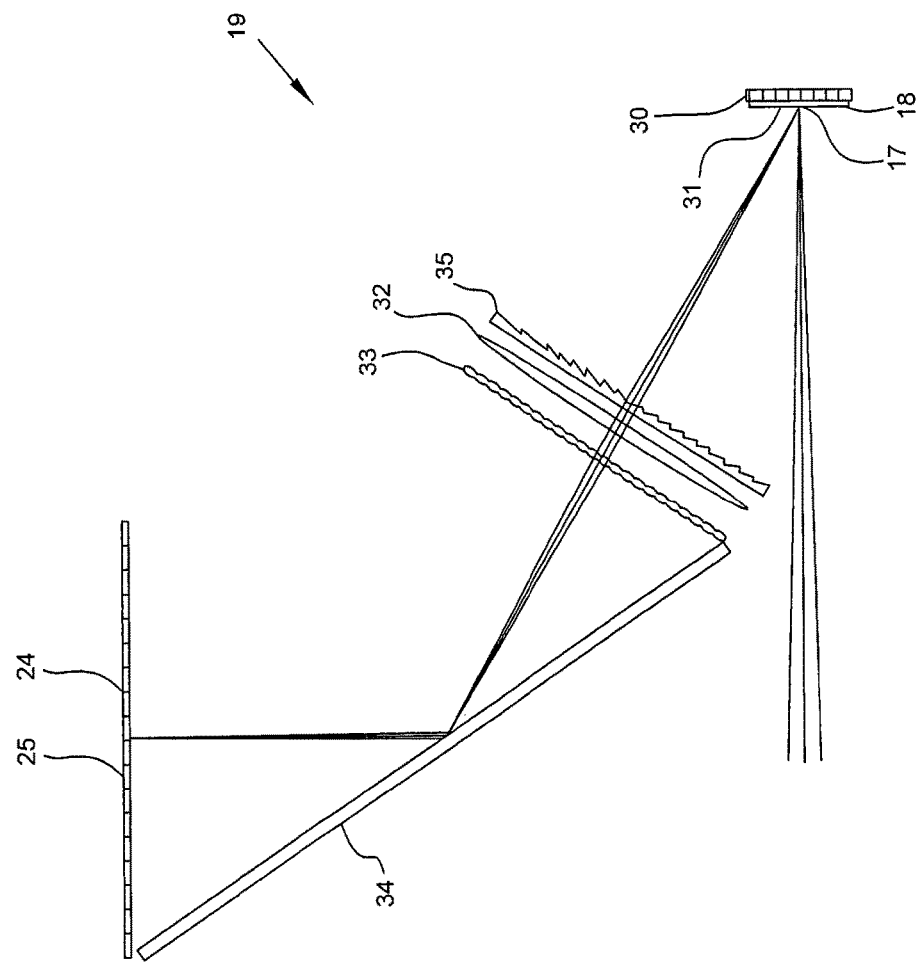
FIG. 8 shows a modification of the detector device 19 in FIG. 7.
Figure 10C:
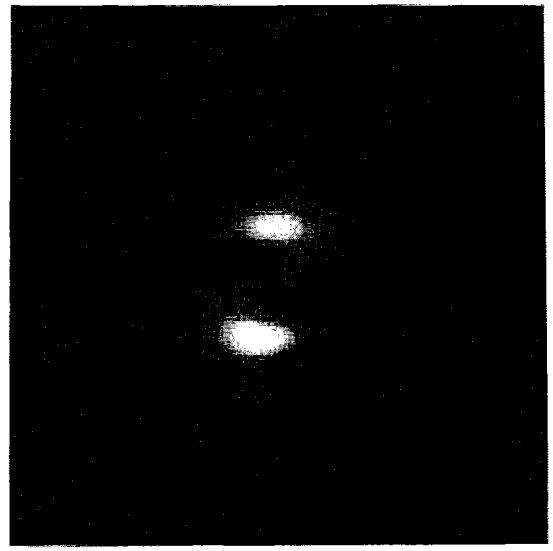
FIG. 10(c) shows a 2D intensity distribution 200 nm outside the focus.
Figure 10B:
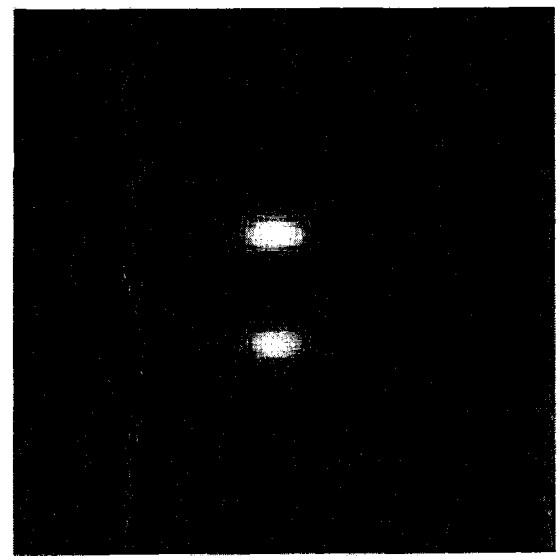
FIG. 10(b) shows a 2D intensity distribution in the focus.

FIG. 8 shows one implementation of the detector device 19 in FIG. 7, wherein a refractive element 35 is still arranged in front of the lens 32, and distributes the radiation particularly well to a detector row.

The detector array 24 can, as already mentioned, be selected based on its geometry, with no further limitations. Of course, the redistribution element in the detector device 19 must then be matched to the corresponding detector array. The size of the individual pixels with which the image 17 is resolved is also no longer prespecified by the detector array 24, but rather by the element which produces the redistribution of the radiation from the detection plane 18. For an Airy disk, the diameter of the disk in a diffraction-limited image is given by the formula $1.22 \cdot \lambda/NA$, wherein $\lambda$ is the average wavelength of the imaged radiation, and NA is the numerical aperture of the lens 13. The full width at half maximum is then $0.15 \cdot \lambda/NA$. In order to achieve high resolution, it is sufficient for location accuracy of the detection to be made twice as high as the full width at half maximum—meaning that the full width at half maximum is sampled twice. A facet element 31 and/or an end of an optical fiber 21 at the optical fiber bundle input 22 may therefore be, at most, half as large as the full width at half maximum of the diffraction-limited single image. This of course is true taking into account the reproduction scale which the optics behind the lens 13 produces. In the simplest case, a 4×4 array of pixels in the detection plane 18 per full width at half maximum would thereby be more than adequate.

The zoom lens which was explained with reference to FIGS. 5 and 6, makes possible—in addition to a [size] adaptation in such a manner that the diffraction distribution of the diffraction-limited image 17 of the spot 14 optimally fills out the input surface of the detector device 19—a further operating mode, particularly if more than one Airy disk is imaged in the detection plane 18. In a measurement in which more than one Airy disk is imaged on the detector device 19, light from further depth planes of the sample 2 can be detected on the pixels of the detector device 19 which are further outward. During the processing of the image, additional signal strengths are obtained without negatively influencing the depth resolution of the LSM 1.

The zoom lens 27 and/or 29 therefore makes it possible to choose a compromise between the signal-to-noise ratio of the image and the depth resolution.

In a laser scanning microscope (LSM), an increase in resolution is achieved by the so-called pinhole in front of the detector being reduced to a size which is significantly smaller than the diffraction limit ($\leq$Airy/4). In this case, this is called a confocal laser scanning microscope. The "Airy" is defined via the first zero point of a detection light illumination spot, and is an established term in the technical literature of optics.

In the case of a fluorescence LSM in the class, there is a decisive disadvantage in the current methods used to achieve increased resolution: the very poor signal-to-noise ratio as a result of the low number of detected photons which come from the sample, which in practice leads to situation where it is impossible to improve the resolution.

A further disadvantage of the fluorescence LSM in the class is the low image capture speed compared to a wide-field microscopy method.

However, at this point, it is possible to increase the resolution of a laser scanning microscope, with a simultaneously improved signal-to-noise ratio. For this purpose, a configuration must have a larger pinhole diameter (approx. 1 Airy), which means a higher number of detectable photons, and must have a detection with sub-Airy location accuracy. Following the capture of the image, a re-sorting and classification of the data is carried out by means of a special algorithm. This then leads to an increased resolution in the sample image. This method, from Colin Sheppard, is also termed the accumulation of shifted sub-Airy detector values in the literature [3-7].

The methods named do not only function for fluorescing samples. They can also be used for the imaging of coherently interacting material samples. In this case, the method hardly offers advantages with respect to the detection photon budget. Rather, the advantage is that the total transmission function has double the bandwidth, substantially contingent on the pupil function. This means that the higher object frequencies have the same weighting as the lower object frequencies.

However, a prerequisite for the method to be used for coherently interacting material samples is that both the amplitude and the phase are measured with a sub-Airy location accuracy, with a high sampling rate.

The field of fluorescence microscopy is taken as an example below.

FIGS. 1-8 describe a rapid, sensitive, and low-noise multi-element detection device based on a fiber bundle and a PMT array, such that it is possible to achieve an improved resolution for a LSM, simultaneously with a good signal-to-noise ratio.

The problem addressed by the invention can be seen as that of improving the image capture speed and the ability of the illumination light distribution to be adapted to the application, in a LSM, and therefore to establish the same as advantages over a conventional LSM.

Similarly to a laser scanning microscope with a sub-Airy position resolving detector device, based on the principle, there is a relative shift between the illumination point spread function (the illumination (intensity) PSF) and the detection point spread function (the detection (intensity) PSF) for off-axis detector elements.

Off-axis detector elements (the outer fibers of the bundle), have a point spread function in the sample plane which is somewhat shifted with respect to the illumination PSM.

A technically preferred embodiment of a sub-Airy position resolving detector device 60 has proven particularly advantageous, consisting of a fiber bundle array 64 which redistributes all detection light 53 to a PMT array 61.

In the conventional configuration, point-symmetrical point spread functions are used for the illumination and detection. In this way, the configuration avoids technological complexities, including further necessary optical components which enable, by way of example, a rotation of the sample or rotation of the scanning device. The calculations are also simpler, because the point spread functions can be described more simply mathematically.

As an advancement of the prior art, and therefore as an essential difference, the illumination and/or detection PSF in the solution according to the invention described herein has a shape which is active and suitably structured. This enables a broad set of applications, and moreover enables the optimum adaptation of the point spread function to a specific application and to specific sample properties.

The embodiments according to the invention are subject to fundamental conditions which make necessary a compromise between the optimum technical parameters for an application. By way of example, it may be necessary, due to the limited selection of detector elements, to find a compromise between an optical resolution and scanning speed of the sample, by means of the illumination light.

The core of the method according to the invention is therefore an advantageous design of the illumination point spread function and/or the detection point spread function.

The invention is characterized by the features of the independent claims.

Preferred implementations are the subject matter of dependent claims.

(a) Lateral speed-optimized illumination PSF.

The illumination PSF shape is modified via a spatial phase modulation in a pupil and/or near to a pupil or in a plane which is optically conjugated to the objective pupil, in such a manner that (as shown in FIG. 9-FIG. 15) the frequency content of the PSF still makes it possible to achieve at least the typical confocal resolution at a pinhole diameter in the detection beam path 63 of approx. one Airy, following computations. At the same time, the PSF should cover the greatest possible surface area. In this manner, it is possible according to the invention to achieve a significantly higher image capture speed by means of a parallelized detection of sample light from a comparably larger sample region. As such, the configuration takes advantage of the benefits of the ultra-fast, sensitive detector device 60, which essentially constitutes an ultra-fast mini-camera.

According to the invention, the speed advantage in the scanning is achieved via the adjustment of the "coarser" pixels (scan steps). This means that the absolute increase in the capture speed results simply from the parallelization of the slow scanning axis. The parallelization in the fast scanning axis, however, enables a relative increase in the capture speed because the exposure time can be reduced by the parallelization. However, this is only true in the case in which the maximum speed has not yet been reached. If the maximum speed has been reached, either the signal-to-noise ratio can be increased while the number of pixels remains the same, or vice-versa, with the signal-to-noise ratio remaining the same and the number of pixels on the fast axis being reduced.

One simple, preferred embodiment according to the invention, of a phase plate, is a n-step phase mask (FIG. 9a). This phase mask, which has a π-phase jump in the center of the plate, generates two nearly Fourier-limited illumination spots which lie closely next to each other. This means that it is possible to double the scanning speed by means of such a mask.

This means that, in a high-NA objective, the polarization vector should be oriented parallel to the phase jump edge. Otherwise, the minimum in the center will not reach zero.

A further preferred embodiment according to the invention, of a phase plate, is an n·2π spiral phase mask (FIGS. 9b and 9c). Such a phase mask generates an illumination light distribution in the shape of a donut mode in the sample plane. The donut illumination ring also has steep flanks, like the conventional illumination PSF of a conventional LSM. However, its size covers a surface area which is four times as large as a Fourier-limited illumination spot. The degree of the parallelization, and therefore the gain in speed, can be adjusted by varying the outer and inner diameters of the donut mode. The detection light generated by the donut illumination ring is imaged on the detector device 60.

High-NA objectives, in combination with a spiral phase mask, require circularly polarized light to generate a donut mode.

It can also be contemplated that suitable phase plates are integrated for the purpose of generating more than two spots (≥3) in the illumination beam path.

(b) Axial speed-optimized PSF.

According to the invention, the detection PSF shape can also be determined via a phase mask in such a manner that the frequency content of the detection PSF still makes it possible to be able to achieve at least the typical confocal resolution following computations, and simultaneously to laterally code and maximize the z-information via different planes in such a manner that the greatest possible number of z-planes contribute to an image for a given lateral resolution (FIG. 10). This is achieved, by way of example, by the use of cylindrical lenses, because the detection PSF in this case is laterally elliptical according to the z-position.

Figure 13:
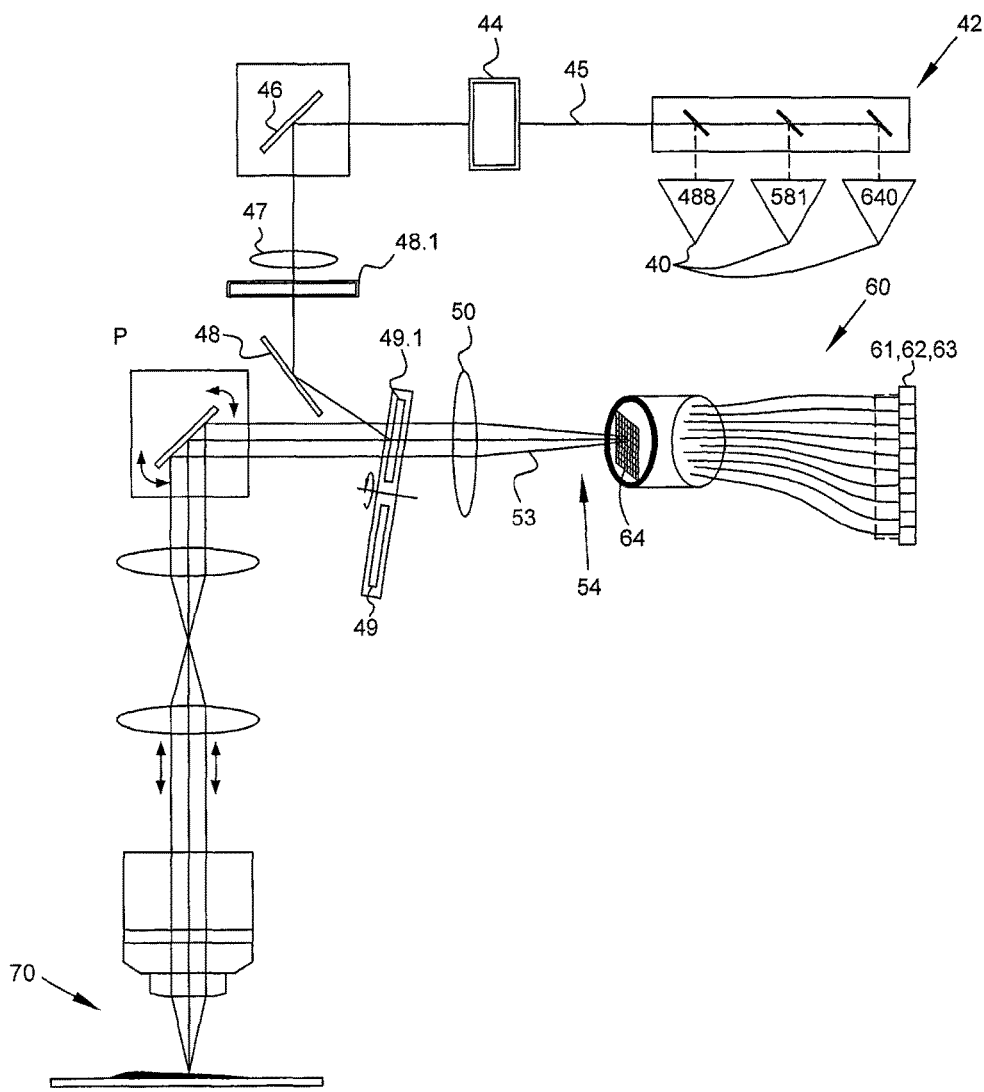
FIG. 13 shows an embodiment of laser scanning microscope with an ultra-fast, sensitive, and position-resolving detector device 60.

In addition, the method can be implemented by tilting the PSF, or by using helical point spread function shapes (see, Pistun, Moerner, item [8] above, Soeller & Baddeley), which can be generated in the detection beam path using suitable phase masks (FIG. 13).

If the illumination PSF shape is additionally modulated to make it possible to generate the steepest possible edges of the overall point spread function in the z-direction, the result is a simpler assignment of the measured signal to the different z-planes.

(c) Improved z-resolution/z-resolution with improved contrast.

According to the invention, the detection PSF shape is further modified via a phase mask in such a manner that the frequency content of the PSF still makes it possible to attain at least the typical confocal resolution following computations, while the z-information is laterally coded and maximized via different planes in such a manner that the fewest possible z-planes contribute to an image for a given lateral resolution, and the derivation of the z-PSF in the z-direction has the greatest possible value. The helical shape (literature item [8]) is one example of a solution in this case.

The effect named above can be amplified if an illumination light distribution is generated which is as disjointed as possible with respect to the detection light distribution. This means that two different masks would be used in this case-one in the illumination beam path and another in the detection beam path.

(d) Two illumination-color imaging on a position-resolving detector device (with nearly confocal resolution).

The phase mask is designed in such a manner that the phase functions differ, according to the illumination wavelength, in such a manner that the illumination light distributions applied simultaneously with different wavelengths in the focus of the illumination lens only overlap spatially to the least possible degree both in the sample plane and ultimately on the position-resolving detector (the fiber bundle). According to the invention, it would be advantageous in this case if an optimizable adaptation device is designed, for the optical element which generates the phase functions, for illumination wavelength combinations which can be suitably adjusted according to dye pairings.

The bandwidth of the illumination- and detection point spread function when a phase mask is used should not differ substantially in this case from that of the detection light illumination- and detection point spread function, such that it is possible to achieve the typical confocal resolution.

The computations subsequent to a capture of the image data, for a spatial and spectral separation of the image data, can be performed using color demixing algorithms.

(e) Multi-Color imaging onto a position-resolving detector device (fiber bundle/detector array).

It can also be contemplated that a chromatically active optical phase element is inserted into the detection beam path, enabling a specific assignment between fibers in the fiber bundle and wavelengths in the fluorescence color spectrum (based on the concept of a spectral detector). In this case, the bandwidth of the illumination- and detection point spread function when a phase mask is used should also not differ substantially from that of the detection light illumination- and detection point spread function, such that it is possible to achieve the typical confocal resolution.

In addition to the generation of the illumination light- and/or detection light distribution, another aspect which is essential to the invention is the flexibility in the design of the light distributions adapted to the application. In addition to the shape of the light distribution, the wavelength—most of all—of the illumination and detection also changes in the application.

Spatial light modulators offer a high degree of flexibility with respect to the two named features (shape and wavelength). In this case, pixelated liquid crystal and micro-mirror based modulators are hereby named.

A basic demand as far as flexibility is concerned is the necessity of being able to switch between the parallelized operating mode with phase mask to the normal confocal mode. In this case, simple mechanical solutions-such as sliders or revolvers, constitute one embodiment.

Additional features and advantages of the invention are described below with reference to the attached schematic figures.

The invention is substantially based on elements which are arranged substantially on the objective pupil plane or near to the same, which influence the phase of the wavefront differently along its lateral cross-section, thereby creating a spatial structure in the object plane (sample) which can be varied. Such elements are most often termed "phase plates" or "phase masks", and the different way in which the phase is influenced can be generated by coating and/or etching quartz glass with etched depressions—as in the case of transmission gratings— or by a phase shift resulting from differing thicknesses of a transmission element (e.g. a glass plate with steps). Such phase masks can be combined with an amplitude mask.

In particular:

FIGS. 9(a)-(d) show examples for phase/amplitude functions in the pupil, and associated cross-sections through the 2D intensity distribution of the illumination.

FIG. 10 (a) shows an example of a half-pupil phase ramp in the pupil with an opposing alignment of the ramp, and the associated cross-section through the 2D intensity distribution of the illumination.

Figure 11C:
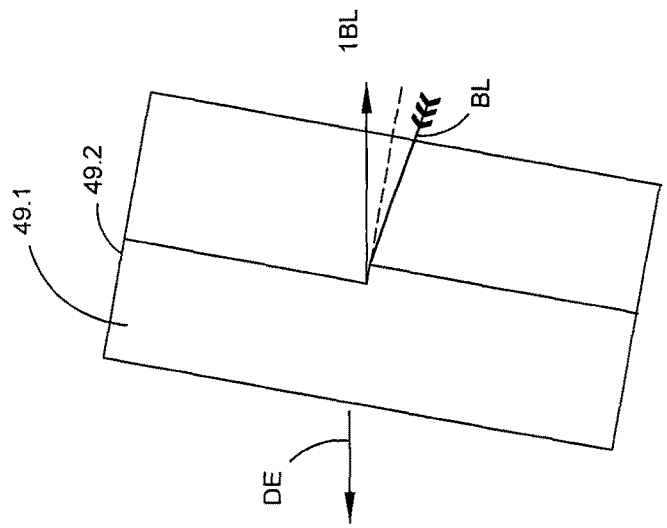
FIGS. 11(a)-(c) show phase masks with differing effects on illumination and detection.
Figure 11B:
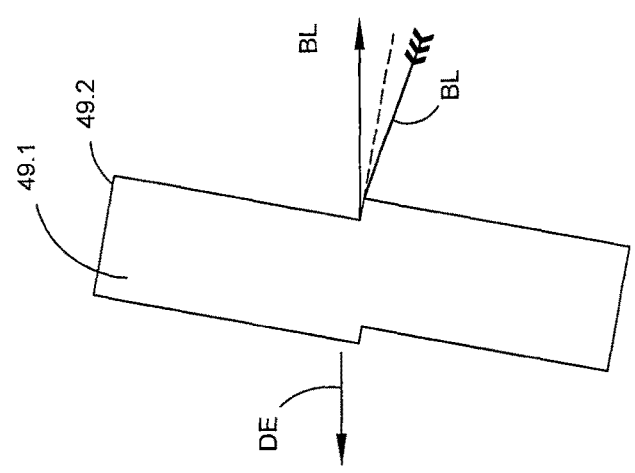
Figure 11A:
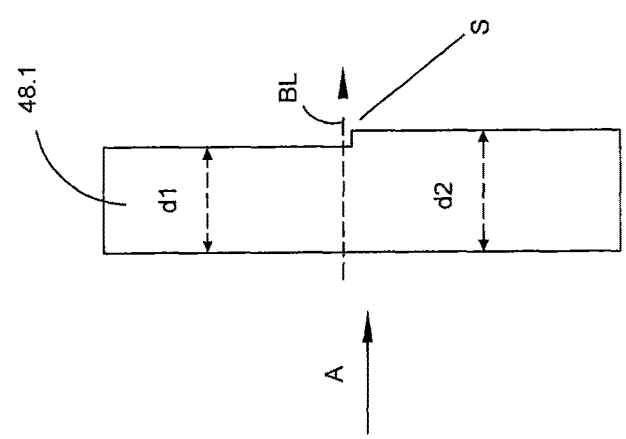

FIG. 10 (b) shows a 2D intensity distribution in the focus;

FIG. 10 (c) shows a 2D intensity distribution 200 nm outside of the focus;

FIGS. 11(a)-(c) show phase masks with differing effects on illumination and detection. FIG. 11(a) shows a non-compensated phase function in a single and/or double passage. FIGS. 11(b) and (c) show a compensated phase function for light propagated through the phase masks in both directions.

Figure 12:
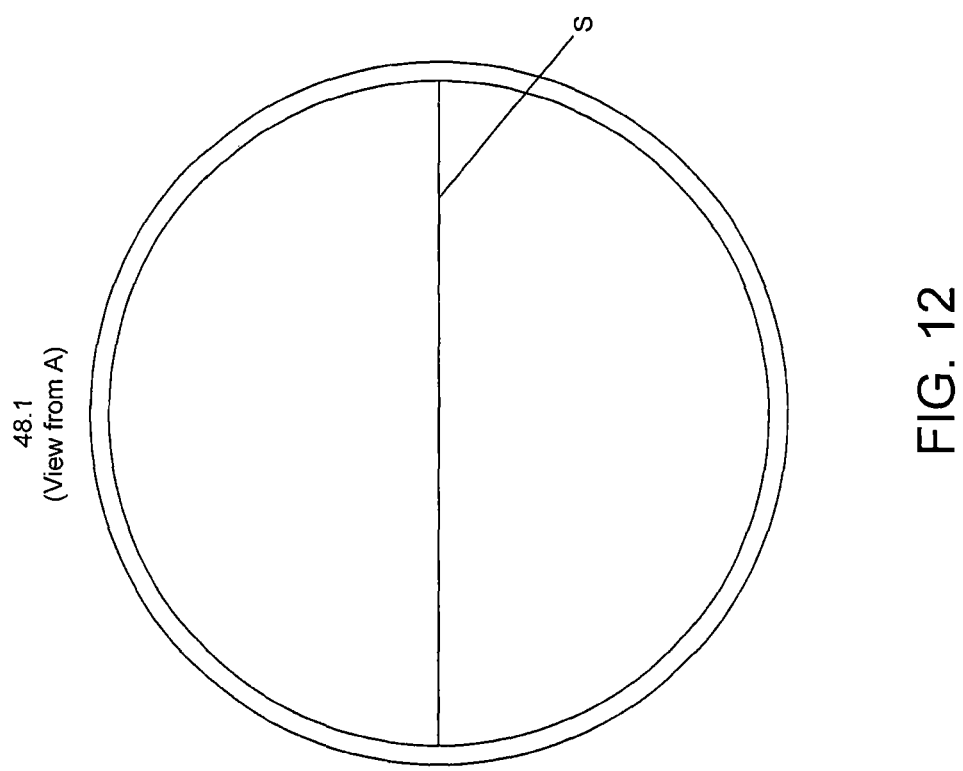
FIG. 12 shows a top view of a phase mask according to FIG. 11(a)

FIG. 12 shows a top view of a phase mask according to FIG. 11(a).

FIG. 13 shows an embodiment of laser scanning microscope with an ultra-fast, sensitive, and position-resolving detector device 60, and with an amplitude/phase mask 48.1 in the illumination beam path in an objective pupil.

Figure 14:
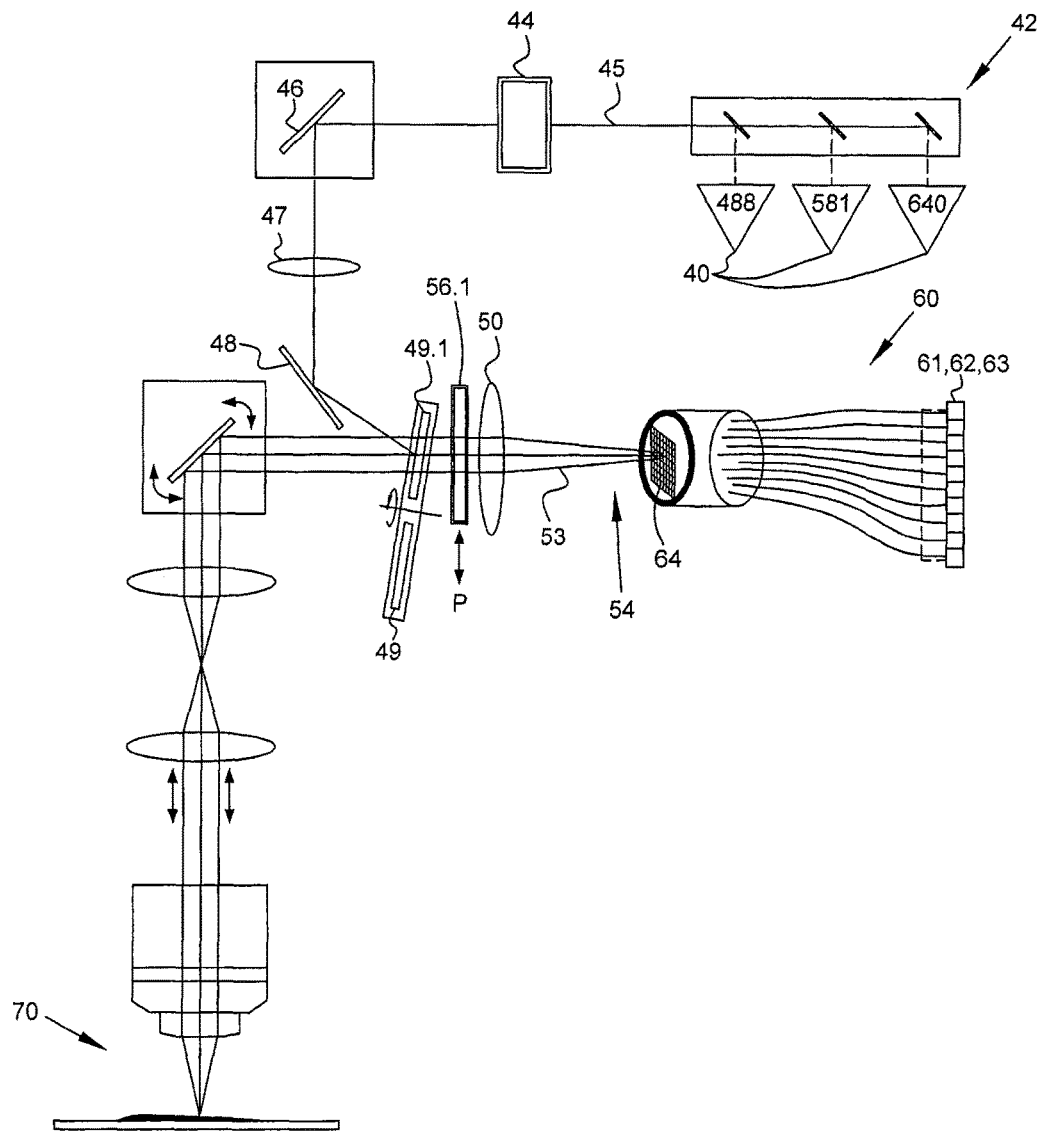
FIG. 14 shows another embodiment of a laser scanning microscope with an ultra-fast, sensitive, and position-resolving detector device 60.

FIG. 14 shows another embodiment of a laser scanning microscope with an ultra-fast, sensitive, and position-resolving detector device 60, and with an amplitude/phase mask 56.1 in the illumination beam path in an objective pupil.

Figure 15:
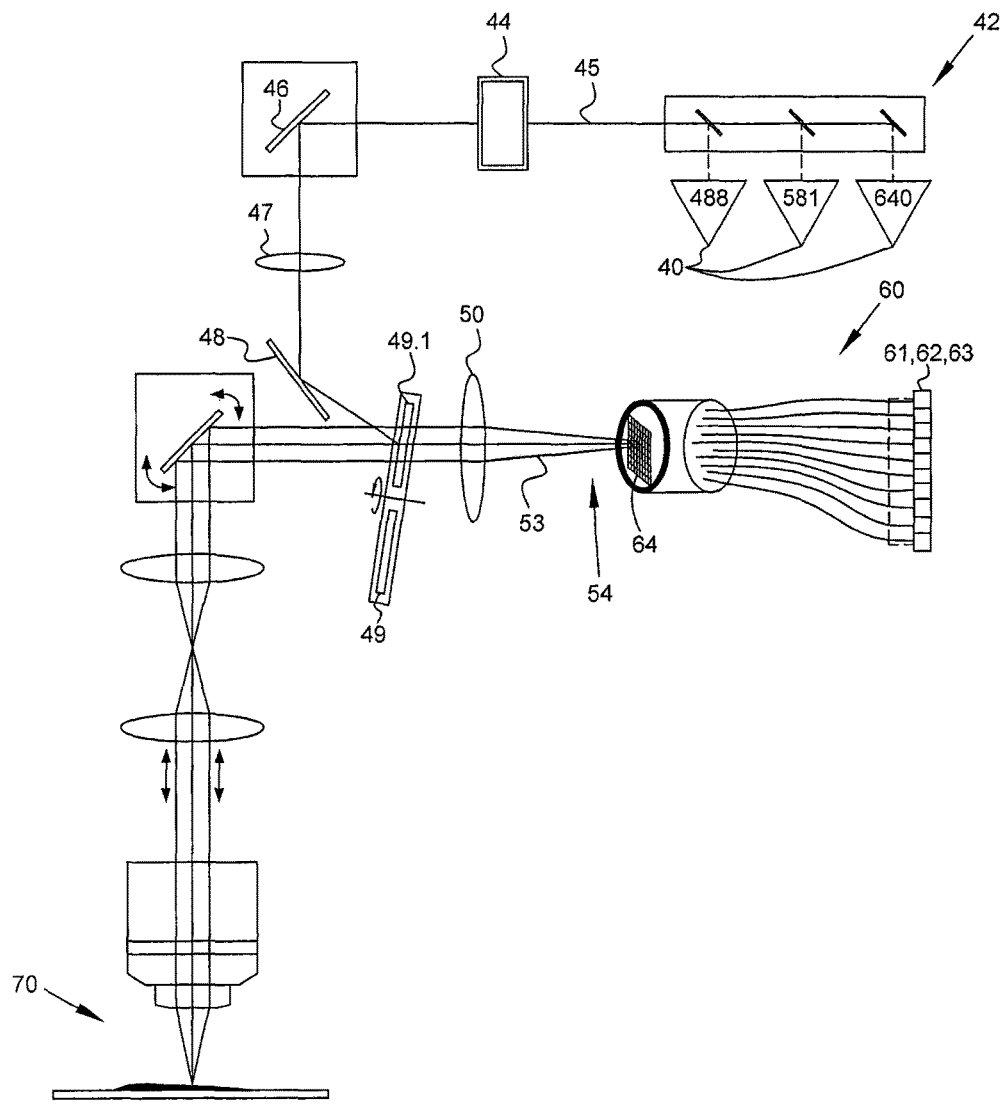
FIG. 15 shows yet another embodiment of a laser scanning microscope with an ultra-fast, sensitive, and position-resolving detector device 60, in a filter-/beam splitter wheel 49.

FIG. 15 shows yet another embodiment of a laser scanning microscope with an ultra-fast, sensitive, and position-resolving detector device 60, and with one and/or more amplitude/phase masks 49.1 in a filter-/beam splitter wheel 49.

Figure 16:
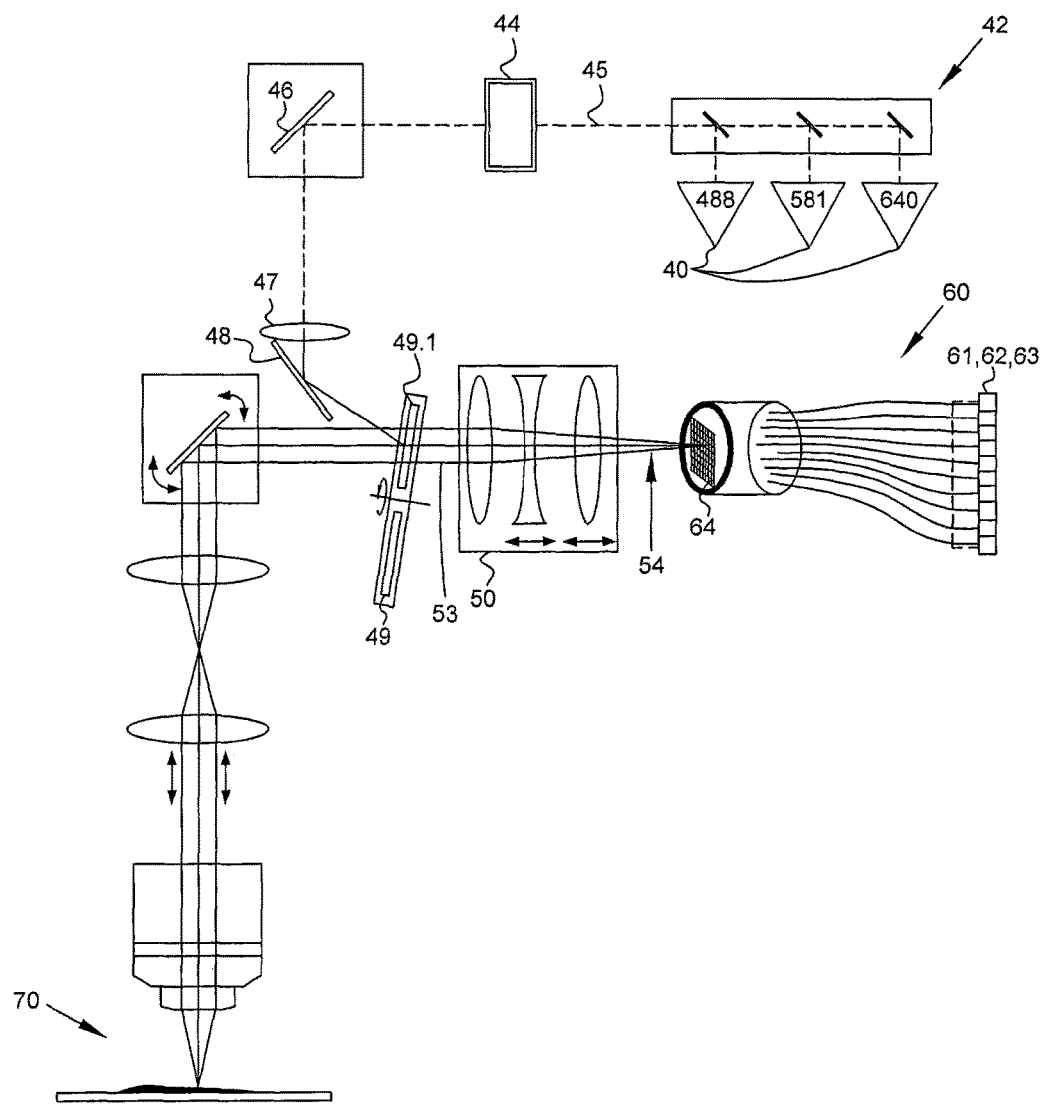
FIG. 16 shows a laser scanning microscope with an ultra-fast, sensitive, and position-resolving detector device 60, and an adjustable detection lens 50.

FIG. 16 shows a laser scanning microscope with an ultra-fast, sensitive, and position-resolving detector device 60, and with one and/or more amplitude/phase masks 49.1 in a filter-/beam splitter wheel 49, and an adjustable detection lens 50.

Figure 17:
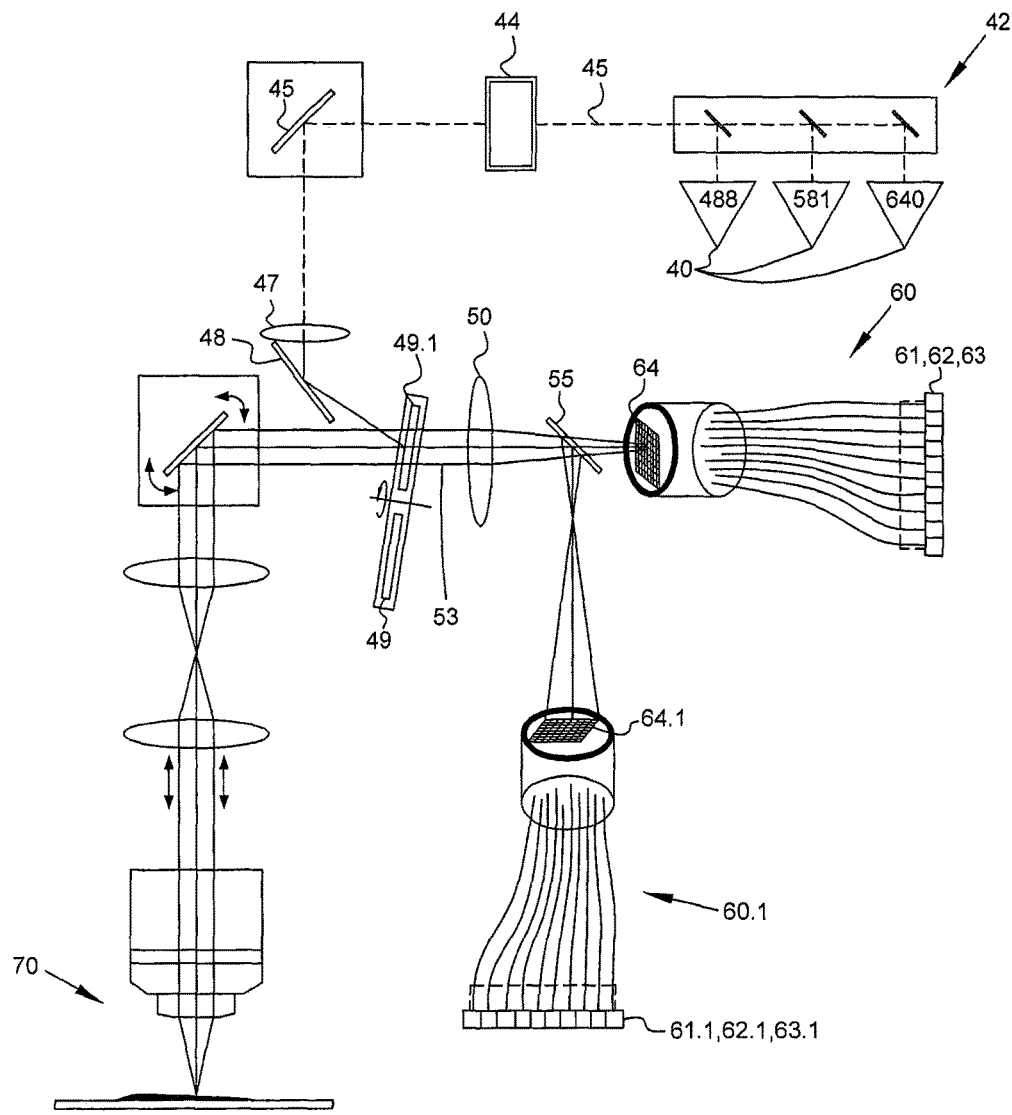
FIG. 17 shows a laser scanning microscope with an ultra-fast, sensitive, and position-resolving detector device 60, and having a spectral, position-resolving two-channel detection.

FIG. 17 shows a laser scanning microscope with an ultra-fast, sensitive, and position-resolving detector device 60, and with one and/or more amplitude/phase masks 49.1 in a filter-/beam splitter wheel 49, and having a spectral, position-resolving two-channel detection.

Figure 18:
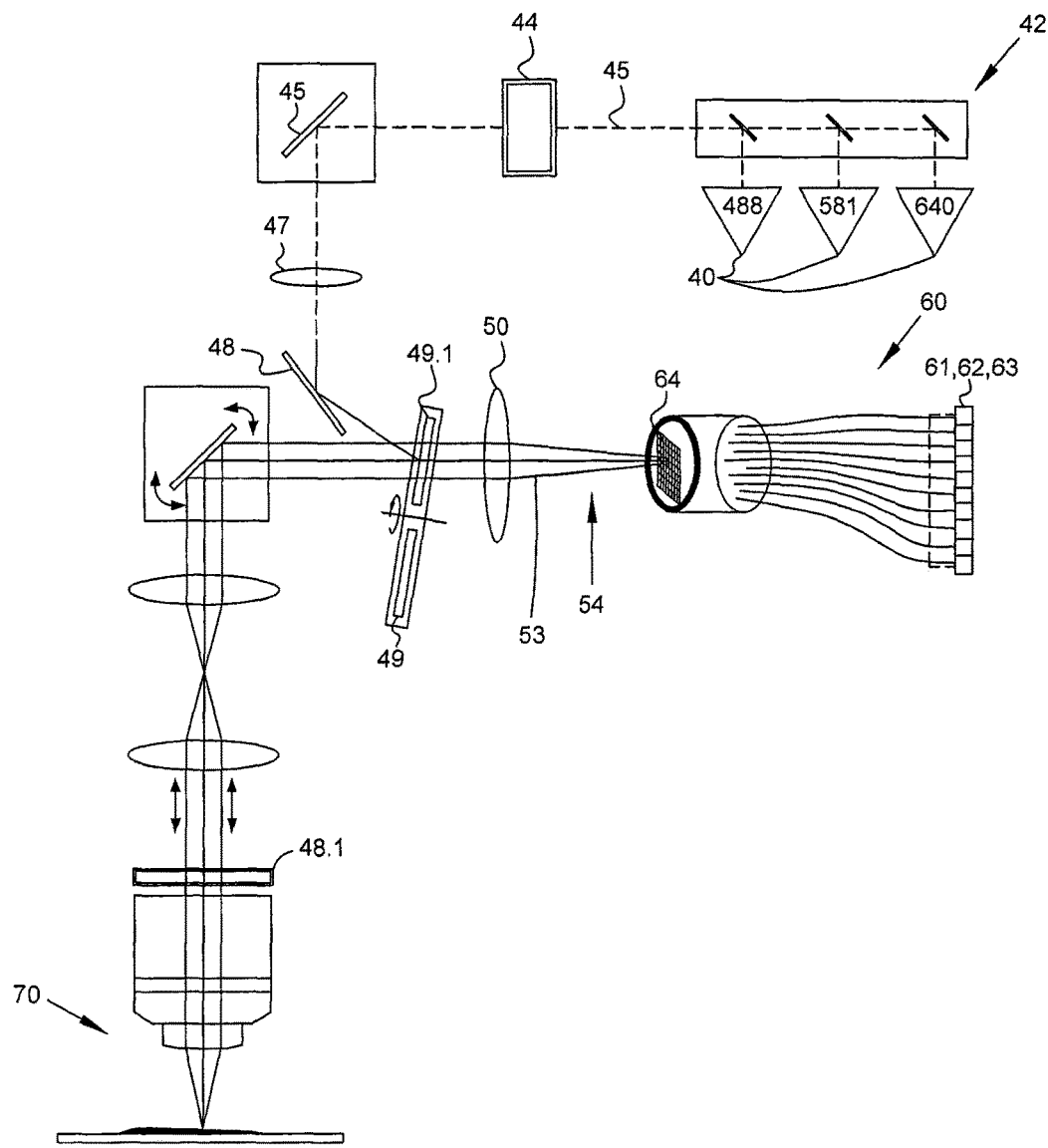
FIG. 18 shows a laser scanning microscope with an ultra-fast, sensitive, and position-resolving detector device 60, and with one and/or more amplitude/phase masks 49.1 in a filter/beam splitter wheel 49.

FIG. 18 shows a laser scanning microscope with an ultra-fast, sensitive, and position-resolving detector device 60, and with one and/or more amplitude/phase masks 48.1 in an objective pupil, and with one and/or more amplitude/phase masks 49.1 in a filter/beam splitter wheel 49.

FIG. 9 shows examples for phase/amplitude functions in the pupil, and associated cross-sections through the 2D intensity distribution of the illumination in the focus of an objective lens.

Different phase masks are illustrated on the left side. The resulting intensity distributions in the object plane are illustrated on the right side according to the lateral position with respect to the optical axis, where the mask is used in an objective pupil in the illumination.

FIG. 9(a) shows a phase mask at left having a phase jump of pi generated between the right and the left sides (half-pupil phase mask).

At right is shown the production of 2 spatially separated spots S1 and S2 lying closely next to each other, rather than a central spot S with an Airy profile, without the implementation of the phase mask.

In FIG. 9(b), a spiral phase mask is illustrated, with a circular, azimuthally increasing phase modification, with a maximum phase delay of 2 pi. The resulting intensity distribution is at right. FIG. 9(c) is a spiral phase mask with a phase jump up to 4 pi.

As a result, the spots illustrated at the right are farther apart than in FIG. 9b).

FIG. 9(d) illustrates an overlap with a half-space mask, as in a), with an additional transmission modification—by way of example as a result of a combination of an amplitude mask A and a phase mask P.

This could be implemented using a corresponding coating as a mask as well.

It is clear that the illumination light distributions illustrated enable a parallelization in the image capture using the detector device 60 described (functioning as a detection camera).

This is because multiple illumination spots are created when the masks are used, which lie very close one beside the other, such that crosstalk problems can arise in thicker samples. The image capture speed is increased by the parallelization named above. It should be noted that the modulation of the illumination will change when aberrations, which can arise with increasing penetration depth in the sample, appear. In this case, adaptive optics as known to a person skilled in the art can correct the imaging errors.

FIG. 10(a) illustrates the intensity profile of the illumination in the focus, with the use of a half-pupil phase ramp HPR.

The two phase ramps in each of the half-pupils have phase modification profiles which are inverted with respect to each other from top to bottom.

The phase ramps in the half-pupils in this case correspond to a glass wedge with a wedge angle of typically one minute.

Here as well, two illumination spots are created which lie closely next to each other. However, it must be ensured that the symmetry of the illumination outside of the focus changes—cf. the images in FIG. 10(b) and FIG. 10(c)—(200 nm outside of the focus in FIG. 10c). This can be advantageous in cases where the intention is to capture a 3D structure using fewer sectional images. This is possible because is spatially distributed onto the camera somewhat differently from different z-planes (input surfaces of the fiber bundle in FIG. 1-8).

Before the data can be more quickly computed and realized with better resolution by means of this axially structured illumination, a z-stack of images is captured by the LSM in the known manner—but in some circumstances with fewer images.

Another suitable illumination light distribution, for the purpose of increasing the image capture speed in the capture of 3D sample volumes (z-stacks) is realized by a rotating double point spread function according to Pavani et al. [literature item 8].

It can be seen in FIG. 11 that the phase/amplitude mask affects the illumination, the detection, or the illumination and detection, depending on the position of the mask. If the mask is positioned at a position in the illumination beam path through which the detection light does not pass, then the mask is designed according to FIG. 11(a). By way of example, a transparent plate

48.1 having different thicknesses d1, d2 in cross-section above and below a jump edge S or a jump point is illustrated.

FIG. 12 shows a schematic illustration of a a-step phase mask in a view from direction A in FIG. 11(a). The illumination light BL therefore undergoes a phase jump in the pupil, which is analogous to FIG. 9(a).

If the same plane would be positioned in a beam path shared by the illumination and detection, then the detection would also be influenced by the phase/amplitude mask.

However, this is not desired, so that the detected image is not falsified.

This is remedied by masks according to FIG. 11(b) and FIG. 11(c), which remove the effect on the detection by a configuration wherein the detection light passes through the inverse phase structure as well, and therefore essentially a coplanar plate in sum.

The glass plate in FIG. 11(b) is structured in such a manner that the optical phase in transmission is identical for two positions which are mirror images of each other in a plane about the optical axis, wherein said plane should be oriented essentially perpendicular to the optical axis.

The structured glass plate in FIG. 11(b), which functions as a primary color splitter, additionally has a dichroic layer 49.2, and functions to separate the illumination light (excitation light) BL and the sample light DE. The illumination light BL is reflected on the dichroic layer 49.2 and travels in the direction of the sample (see FIGS. 1-8). The detection light of the sample DE is transmitted at the accordingly constructed dichroic layer toward the detection, because it demonstrates the Stokes shift.

The phase distribution applied to the illumination light by 49.1 is likewise applied to the sample light DE upon passage through 49.1—but to half the degree. However, it is again removed when the light exits from the structured glass plate, by the inverse surface structure, and the DE therefore further travels toward the detector device without the applied phase difference.

The same mechanism as in FIG. 9(b) and/or FIG. 9(c) can be used as well when phase masks according to FIGS. 9(b)-(d) and FIG. 10 are used, to prevent a spatially varying phase distribution of the detection light DE.

One technically preferred embodiment of a laser scanning microscope, using an ultra-fast, sensitive position-resolving detector device 60 based on FIGS. 1-8, and using an amplitude/phase mask 48.1 exclusively in the illumination beam path 45, is shown in FIG. 13. The sample light 53—generated in the sample by the illumination light and collected by the objective, must be propagated through the actual detector device 61, having the detector elements 62, and not through the amplitude/phase mask 48.1, on the path to the detector device 60, the same consisting of the fiber bundle 64. The unification and/or separation of illumination and detection is performed at a color splitter 49.1 on a color splitter wheel 49.

The structure of the illumination pattern—for example two or three illumination spots, returns to the fiber bundle 64. This means that essentially two or three detection spots are formed at this position, which, however, are expanded and/or modified by the interaction of the illumination with the sample, and by the folding by means of the detection point spread function.

Although the resolution is reduced in some circumstances by the number of fibers in the fiber bundle, the scanning speed is increased—for example by a factor of 2.

In contrast to the technically preferred embodiment in FIG. 13, FIG. 14 shows an amplitude/phase mask 56.1 exclusively in the detection beam path. This can be used according to the invention for the purpose of increasing the capture speed of 3D stacks, or for the purpose of axial resolution/contrast improvement. The mask 56.1 in this case can have a structure according to FIG. 10, by generating parallel detection spots on the distribution of the optical fiber input surfaces 64.

FIG. 15 shows a technologically preferred embodiment of a laser scanning microscope according to the invention, wherein the amplitude/phase mask 49.1 is positioned in the beam path shared by the illumination light 45 and the detection light 53. The amplitude/phase mask 49.1 on the filter wheel 49 must also take over the function of splitting color in this case. This means that the amplitude/phase mask 49.1 also possesses a dichroic layer system for the illumination light. The basic shape must be configured according to FIGS. 11(b) and 11(c) in such a manner that the efficacy is limited exclusively to the illumination light 45 (removal of the phase difference in the detection direction).

The filter wheel 49 can fundamentally serve the purpose of selectively inserting phase masks or simple dichroic beam splitters into the beam path.

Likewise, phase masks inserted in the illumination beam path and/or the detection beam path, illustrated schematically by arrows, can be designed to be slid out of the beam path such that maximum flexibility is ensured with respect to adjustable illumination and/or detection modes.

FIG. 16 differs from FIG. 15 to the extent that an adjustable focusing lens 20 is positioned in front of the detector device 60. The same takes on the task of adapting the size of the detection light distribution 53 to the detector device 60 for a suitable scanning. The size adaptation can be necessary according to the wavelength region of the detection light 53 and/or the objective used for the pupil adaptation and/or according to the illumination light distribution 45 (e.g. two spots or four spots) generated exclusively in the illumination beam path by the mask 49.1 or the mask according to FIG. 13.

FIG. 17 illustrates a technically preferred embodiment having at least two detector devices 60 and 60.1 for the purpose of detecting detection light 53 which is spectrally different following a separation by a color splitter 55, wherein there may also be an overlap between the wavelength ranges of the detection light 53 detected by the at least two detector devices 60, and 60.1.

The phase mask could be arranged on 49, by way of example.

One embodiment is presented in FIG. 18, wherein the amplitude/phase mask 48.1 thereof is positioned directly in the pupil and/or near the pupil on the objective lens. For small scanning angles, the advantage of this embodiment is that there can be no asymmetry with respect to the light distribution relative to the amplitude/phase mask region of 48.1 if the scanning device is not precisely positioned in the pupil (focus) of the scanning lens. However, it must be ensured that there is no change in the function of the amplitude/phase mask 48.1 when the scanning angle is changed. One disadvantage of this arrangement is that the detection light 53 likewise passes through the mask 48.1 and is changed by the same. This can be prevented, particularly if 48.1 is a phase mask, if an inverse phase mask structure is inserted into the color splitter wheel 49 as phase mask 49.1, which only functions for the detection 53.

This can be realized by, by way of example, an inverse phase mask being structured or coated onto the side of the beam splitter opposite the dichroic layer, in the direction of the detection, said phase mask exclusively working on the transmitted detection light (as illustrated in FIG. 11), and removing the effect of 48.1.

This can be realized, as an alternative, by a dichroic layer system being placed on the flat side of 49.1 facing the detection light 53, such that the illumination light 44 is not influenced by the mask 49.1 (see FIG. 11(b), (c)).

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE NUMBERS

BL: illumination light
DE: detection light from the sample
d1, d2: thickness
S: step, edge
40: light sources
42: mirror step with semi-transparent mirrors/color splitters
44: acousto-optic tunable filter (AOTF)
45: illumination light
46: mirror
47: collimating lens
48: mirror
48.1, 56.1 phase mask
49: beam/color splitter wheel
49.1: filter, neutral- or color splitter, phase mask(s)
50: detection lens
53: detection light
54: pinhole plane
60: position-resolving detection device
60.1: second position-resolving detection device
61: detection device (detector array)
62: detector elements of the first detection device
61.1: second detection device (detector array)
62.1: detector elements of the second detection device
64: fiber bundle
64.1: second fiber bundle
70: light microscope

What is claimed is:

1. A microscope for high resolution scanning microscopy of a sample, comprising
an illumination device for the purpose of illuminating the sample using illumination light along an illuminating axis,
an imaging device for the purpose of scanning at least one point or linear spot across the sample and of imaging the point or linear spot with detection light from said sample, said detection light having a detection light axis, into a diffraction-limited, static single image, with a reproduction scale in a detection plane, a detector device for the purpose of detecting the single image in the detection plane for various scan positions, an evaluation device for the purpose of evaluating a diffraction structure of the single image for the scan positions, using data from the detector device, and for the purpose of generating an enhanced resolution image of the sample which has a resolution which is enhanced beyond a diffraction limit, said detector device including a detector array which has pixels and which is larger than the single image, and a non-imaging redistribution element which is arranged between the detector array and the detection plane along the detection light axis and which distributes radiation from the detection plane onto the pixels of the detector array in a non-imaging manner.

2. The microscope according to claim 1, wherein said redistribution element comprises a bundle of optical fibers, which has an input arranged in the detection plane, and an output where the optical fibers end at the pixels of the detector array in a geometric arrangement which differs from that of the input.

3. The microscope according to claim 2, wherein said optical fibers extend from the input to the output in such a manner that optical fibers which are adjacent the output are also adjacent the input, in order to minimize a radiation intensity-dependent crosstalk between adjacent pixels.

4. The microscope according to claim 2, wherein said bundle of optical fibers are multi-mode optical fibers.

5. The microscope according to claim 1, wherein said redistribution element has a mirror with differently inclined mirror elements, said mirror being at least one of a multi-facet mirror, a digital micromirror device (DMD), and an adaptive mirror, which deflects said radiation from the detection plane onto the pixels of the detector array, wherein the pixels of the detector array have a geometric arrangement which differs from that of the mirror elements.

6. The microscope according to claim 1, wherein said imaging device has a zoom lens arranged between the imaging device and the detection plane along the detection light axis in an imaging direction, for the purpose of matching the size of the single image to that of the detector device.

7. The microscope according to claim 6, wherein said illumination device and the imaging device share a scanning device such that the illumination device illuminates the sample with a diffraction-limited point or linear spot which coincides with the spot imaged by the imaging device, wherein the zoom lens is arranged in such a manner that it is also a component of the illumination device.

8. The microscope according to claim 1, wherein said detector array is a detector row.

9. The microscope according to claim 8, wherein said detector row is an Avalanche photodiode (APD) row.

10. The microscope according to claim 8, wherein said detector row is a Photomultiplier tube (PMT) row.

11. A method for high resolution scanning microscopy of a sample, comprising illuminating a sample, guiding at least one point or linear spot over the sample in a scanning manner so that it is imaged into a single image, wherein the spot is imaged into the single image, with a reproduction scale, and diffraction-limited, and the single image is static in a detection plane, detecting the single image for various different scan positions with a location accuracy which is at least twice as high, taking into account the reproduction scale, as a full width at half maximum of the diffraction-limited single image, such that a diffraction structure of the single image is detected, said step of detecting using a detector array having pixels and being larger than the single image, evaluating the diffraction structure of the single image for each scan position and generating an enhanced resolution image of the sample which has a resolution enhanced beyond the diffraction limit, redistributing radiation of the single image from the detection plane on the pixels of the detector array in a non-imaging manner.

12. The method according to claim 11, wherein said radiation of the single image is redistributed by means of a bundle of multi-mode optical fibers, which has an input arranged in the detection plane, and an output where the optical fibers end at the pixels of the detector array in a geometric arrangement which differs from that of the input.

13. The method according to claim 11, wherein said optical fibers extend from the input to the output in such a manner that optical fibers which are adjacent the output are also adjacent the input, in order to minimize a radiation intensity-dependent crosstalk between adjacent pixels.

14. The method according to claim 11, wherein said bundle of optical fibers and the detector array are calibrated, by each optical fiber individually receiving radiation, by interference signals in pixels which are associated with optical fibers which are adjacent thereto at the output being detected, and by a calibration matrix being established, by means of which a radiation intensity-dependent crosstalk between adjacent pixels is corrected in the subsequent microscopy of the sample.

15. The method according to claim 11, wherein said radiation of the single image is redistributed by means of a mirror with differently inclined mirror elements, wherein the radiation from the detection plane is directed by the mirror onto the pixels of the detector array, and wherein the pixels of the detector array have a geometric arrangement which differs from that of the mirror elements.

16. The method according to claim 15, wherein said mirror is a multifaceted mirror.

17. The method according to claim 15, wherein said mirror is a digital micromirror device (DMD).

18. The method according to claim 15, wherein said mirror is an adaptive mirror.

19. The method according to claim 11, wherein said detector array is a detector row.

20. The method according to claim 19, wherein said detector row is an Avalanche photodiode (APD) row.

21. The method according to claim 19, wherein said detector row is a Photomultiplier tube (PMT) row.

22. The method according to claim 11, further comprising determining a direction of movement of the scanning of the point or linear spot signals of individual pixels of the detector array, said determining including evaluating said point or linear spot by means of cross-correlation.

23. The method according to claim 11, further comprising determining and evaluating a chronological change in the diffraction-limited single image for the point or linear spot which is static in the sample.

24. A scanning microscope comprising an illumination device for the purpose of illuminating a sample using illumination light, at least one phase mask in or near an objective pupil, or in a plane which is conjugated to the objective pupil, said phase mask having a variable lateral profile, which influences a phase of a wavefront differently along its lateral cross-section thereby creating a phase influence for the purpose of generating a spatial distribution of at least one of the illumination light and detection light, the scanning microscope having a beam path along an optical axis, wherein the spatial distribution extends in a direction which is at least one of perpendicular to the optical axis and along the optical axis, a scanning device which guides an illumination spot across said sample and descans the spot at which the sample is imaged in a single diffraction limited image, and a pixelated detector resolving the diffraction-limited single image.

25. The microscope according to claim 24, further comprising a combination of amplitude- and phase masks on a carrier, or on two carriers arranged one behind the other along at least one of the illumination beam path and the detection light axis.

26. The microscope according to claim 24, wherein at least one phase mask comprises a half pupil phase mask with variable phase profiles on each of its two sides.

27. The microscope according to claim 26, wherein the profiles on the two sides are inverses of each other.

28. The microscope according to claim 24, having a phase jump on the phase mask.

29. The microscope according to claim 28, having a phase mask which has an edge for the purpose of separating regions of different thicknesses.

30. The microscope according to claim 24, wherein the phase mask is a spiral phase mask.

31. The microscope according to claim 24, having a glass plate in front of the detection plane along the detection light axis in a direction of detection with a different thickness along its cross-section for the purpose of influencing the phase.

32. The microscope according to claim 24, wherein the phase mask is arranged in at least one of the illumination beam path and the detection beam path.

33. The microscope according to claim 24, wherein the phase mask is arranged in the common portion of the illumination beam path/detection beam path.

34. The microscope according to claim 24, further comprising a separating element for influencing the phase.

35. The microscope according to claim 24, wherein the phase mask is arranged in the objective pupil upstream of an objective along the illumination beam path in a direction of illumination.

36. The microscope according to claim 24, wherein said phase mask is one which removes the phase influence and is included along an axis of the detection light in a direction of detection.

37. The microscope according to claim 36, wherein at least one of said phase mask and another phase mask have an inverted profile of the phase influence.

38. A microscope according to claim 24, further comprising a dichroic beam splitter upstream of a detection plane along an axis of the detection light in a direction of detection to provide a split with at least two detection beam paths.

39. The microscope according to claim 24, further comprising a zoom lens arranged in a detection beam path, located upstream of a detection plane in a direction of detection.

40. The microscope according to claim 24, further comprising a spatial light modulator (SLM) to influence at least one of the phase and amplitude, said SLM being in a detection beam path located upstream of a detection plane in a direction of detection.

41. The microscope according to claim 24, further comprising a chromatically-active, phase mask included as the phase mask in a detection beam path, for the purpose of applying different detection light wavelengths with at least a partial spatial division along an optical axis.

42. The microscope according to claim 41, wherein the chromatically-active phase mask is structurally designed in such a manner that a phase function varies according to an illumination wavelength.

43. The microscope according to claim 41, wherein said chromatically-active phase mask is a chromatically-active optical phase element inserted into the detection beam path, and realizes a specific functional assignment between one or more fiber input surfaces and one or more wavelengths.

44. The microscope according to claim 42, wherein distributions of said illumination light do not substantially spatially overlap in at least one of a sample plane and in the detection beam path of position-resolving detectors.

45. The scanning microscope according to claim 24 further comprising an evaluation device for evaluating the diffraction limited single image using data from the detector for generating an enhanced resolution image which has a resolution beyond a diffraction limit of the microscope.

* * * * *

UNITED STATES PATENT AND TRADEMARK OFFICE
CERTIFICATE OF CORRECTION

PATENT NO. : 9,864,182 B2
APPLICATION NO. : 14/489885
DATED : January 9, 2018
INVENTOR(S) : Ingo Kleppe et al.

Page 1 of 1

It is certified that error appears in the above-identified patent and that said Letters Patent is hereby corrected as shown below:

In the Specification

Column 6, Line 24-25: now reads: "illumination device and the imaging device have a shared or common scanning device which guides an illumination spot,"
Should read: --illumination device and the imaging device have a shared scanning device which guides an illumination spot--

Column 14, Line 19: now reads: "invention, of a phase plate, is a n-step phase mask (FIG 9a)."
Should read: --invention, of a phase plate, is a $\pi$-step phase mask (FIG 9a).--

Column 18, Line 13: now reads: "FIG. 12 shows a schematic illustration of a a-step phase"
Should read: --FIG. 12 shows a schematic illustration of a $\pi$-step phase--

In the Claims

Column 22, Line 67: now reads: "said phase mask having a variable lateral profile, which"
Should read: --said phase mask having a variable lateral profile which--

Signed and Sealed this
Twelfth Day of June, 2018

Andrei Iancu
*Director of the United States Patent and Trademark Office*